US007701495B2

(12) United States Patent
Higashitsutsumi et al.

(10) Patent No.: US 7,701,495 B2
(45) Date of Patent: Apr. 20, 2010

(54) IMAGE CAPTURE DEVICE AND CONTROLLER OF IMAGE CAPTURE DEVICE

(75) Inventors: Yoshihito Higashitsutsumi, Mizuho (JP); Yuzo Otsuru, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 924 days.

(21) Appl. No.: 11/067,289

(22) Filed: Feb. 24, 2005

(65) Prior Publication Data

US 2005/0190275 A1 Sep. 1, 2005

(30) Foreign Application Priority Data

Mar. 1, 2004 (JP) ............................ 2004-056900
Mar. 1, 2004 (JP) ............................ 2004-056901

(51) Int. Cl.
*H04N 9/083* (2006.01)
*H04N 3/14* (2006.01)

(52) U.S. Cl. ........................ 348/272; 348/273; 348/297

(58) Field of Classification Search .............. 348/223.1, 348/222.1, 362, 294, 301, 241, 297, 300, 348/303, 304, 273, 272, 277, 278, 279, 280, 348/242, 196
See application file for complete search history.

(56) References Cited

U.S. PATENT DOCUMENTS 4,054,915 A * 10/1977 Sugihara ..................... 348/283
5,757,427 A 5/1998 Miyaguchi
6,046,829 A 4/2000 Noda
6,355,949 B1 * 3/2002 Kawai ........................ 257/215
6,674,469 B1 1/2004 Watanabe
6,956,605 B1 * 10/2005 Hashimoto .................. 348/301
7,079,184 B2 7/2006 Yanai
7,154,552 B1 * 12/2006 Watanabe ................... 348/362
7,199,826 B2 * 4/2007 Uya ........................... 348/273
2002/0089598 A1 7/2002 Ishimoto et al.

(Continued)

FOREIGN PATENT DOCUMENTS

JP 62101185 A 5/1987

(Continued)

OTHER PUBLICATIONS

Chinese Language Office Action and its English translation for corresponding Chinese Application No. 2005100090545 lists the references above.

(Continued)

*Primary Examiner*—David L Ometz
*Assistant Examiner*—Ahmed A Berhan
(74) *Attorney, Agent, or Firm*—Hogan & Hartson LLP

(57) ABSTRACT

An image capture device capable of capturing high quality images is disclosed. The image capture device comprises a shift register, each pixel of which has a plurality of transfer electrodes extending in a direction crossing a transfer direction of information charges. A potential well formed by function of the transfer electrodes is used to store and transfer information charges generated in response to light incident on a pixel. In this image capture device, during image capture, information charges are stored in a plurality of potential wells substantially separated from each other, and, during transfer, information charges stored in at least two of the plurality of potential wells are combined by addition to be transferred.

10 Claims, 20 Drawing Sheets

U.S. PATENT DOCUMENTS

| | | | | |
|---|---|---|---|---|
| 2002/0135689 | A1 | 9/2002 | Uya | |
| 2003/0030737 | A1 | 2/2003 | Yanai | |
| 2003/0086005 | A1 * | 5/2003 | Nakamura | 348/223.1 |
| 2006/0209202 | A1 | 9/2006 | Yanai | |

FOREIGN PATENT DOCUMENTS

| | | | |
|---|---|---|---|
| JP | 63219277 | A | 9/1988 |
| JP | 06-112467 | | 4/1994 |
| JP | 9298288 | A | 11/1997 |
| JP | 11137514 | A | 5/1999 |
| JP | 2000261729 | A | 9/2000 |
| JP | 2001-061094 | | 3/2001 |
| JP | 2001-166284 | | 6/2001 |
| JP | 2002209146 | A | 7/2002 |
| JP | 2002270809 | A | 9/2002 |
| JP | 2003052049 | A | 2/2003 |
| JP | 2003-143614 | | 5/2003 |
| KR | 2000-0062929 | | 10/2000 |

OTHER PUBLICATIONS

Japanese language office action and its English translation for corresponding Japanese application No. 2004-056901 lists the references above.

Japanese language office action and its English language translation for corresponding Japanese application 2004056900 lists the references above.

* cited by examiner

| | | | | | | | |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| 34-1 | 34-2 | 34-1 | 34-2 | 34-1 | 34-2 | 34-1 | 34-2 |

IMAGE CAPTURE DEVICE AND CONTROLLER OF IMAGE CAPTURE DEVICE

CROSS-REFERENCE TO RELATED APPLICATIONS

The entire disclosures of Japanese Patent Application Nos. 2004-56900 and 2004-56901 including specification, claims, drawings, and abstract are incorporated herein by reference.

BACKGROUND OF THE INVENTION

1. Field of the Invention

The present invention relates to an image capture device in which a captured image has an improved image quality, and to a controller of such an image capture device.

2. Description of the Related Art

FIG. 17 shows a structure of an image capture device 100 including a CCD solid state image capture element. The image capture device 100 includes a CCD solid state image capture element 102, a timing control circuit 104, and a driver circuit 106. The CCD solid state image capture element 102 has an image capture section 2*i*, a storage section 2*s*, a horizontal transfer section 2*h*, and an output section 2*d*. In response to a clock pulse having a predetermined frequency and an external control signal, the timing control circuit 104 generates a control signal for use in controlling the image capture, vertical transfer, horizontal transfer, and output of the CCD solid state image capture element 102. The control signal is input to the driver circuit 106. In response to the control signal generated from the timing control circuit 104, the driver circuit 106 outputs a clock pulse at a necessary time to each of the image capture section 2*i*, the storage section 2*s*, the horizontal transfer section 2*h*, and the output section 2*d* of the CCD solid state image capture element 102.

In response to the clock output from the driver circuit 106, the CCD solid state image capture element 102 performs image capture, vertical transfer, horizontal transfer, and output. In the image capture section 2*i*, light receiving pixels constituting respective bits are arranged in a two-dimensional matrix. Light incident on the image capture section 2*i* is subjected to photoelectric conversion in the light receiving pixels so that information charges are generated. Application of a vertical transfer clock causes vertical shift registers of the image capture section 2*i* to transfer the two-dimensional array of information charges generated in the image capture section 2*i* to the storage section 2*s* at high speed. As a result, information charges for one frame are held in vertical shift registers of the storage section 2*s*. Then, the information charges are transferred from the storage section 2*s* to the horizontal transfer section 2*h* in units of one line. Further, application of a horizontal transfer clock causes transfer of the information charges from the horizontal transfer section 2*h* to the output section 2*d* in units of one pixel. The output section 2*d* converts the amount of charge for each pixel to a value of voltage, and outputs the change in the value of voltage as an output of the CCD.

The image capture section 2*i* and the storage section 2*s* include vertical shift registers in which a plurality of channel regions extend in parallel with each other in a vertical direction (corresponding to the longitudinal direction of the CCD solid state image capture element 102 shown in FIG. 17) and a plurality of transfer electrodes intersect the channel regions. Each bit of the shift registers functions as one of the light receiving pixels arranged in the two-dimensional matrix.

As shown in FIGS. 18A to 18C, the image capture section 2*i* has a structure in which a plurality of shift registers are formed in a surface region of a semiconductor substrate 9. FIG. 18A is a schematic plan view showing a part of a related art image capture section 2*i*, and FIGS. 18B and 18C are cross-sectional side views taken along lines A-A and B-B, respectively, of FIG. 18A.

As shown in FIG. 18B, a P well 11 doped with a p-type impurity is formed in the n-type semiconductor substrate 9. An N well 12 highly doped with an n-type impurity is formed in a surface region on the P well 11. The term "surface region" as used herein refers to a region near the surface of the semiconductor substrate 9. In order to separate the channel regions of the vertical shift registers, separation regions 14 consisting of p-type impurity regions are formed by ion implantation of a p-type impurity in parallel with each other at predetermined intervals in the N well 12. Adjacent separation regions 14 are used to electrically divide the N well 12 so that a region existing between the separation regions 14 constitutes a channel region 22, that is, a transfer path for transferring information charges. The separation regions 14 form potential barriers between adjacent channel regions, and electrically separate the channel regions 22.

An insulating film 13 is formed on the surface of the semiconductor substrate 9. A plurality of transfer electrodes 24 formed of polysilicon films are arranged in parallel with each other so as to intersect the extending direction of the channel regions 22 at right angles, with the insulating film 13 being interposed between the channel regions 22 and the transfer electrodes 24. With reference to the related art image capture section 2*i*, a group of three adjacent transfer electrodes 24-1, 24-2, and 24-3 constitutes one pixel.

FIG. 19 shows a state of potential distribution within the N well 12 along a channel region 22 during image capture. For capturing an image, one transfer electrode 24-2 of each group of transfer electrodes 24 is turned on, and potential wells 50 are formed in the channel region 22 below the transfer electrodes 24-2. By turning off the other transfer electrodes 24-1 and 24-3, information charges are stored in the potential wells 50 formed below the turned-on transfer electrodes. During transfer, as shown in FIG. 20, transfer clocks $\phi 1$, $\phi 2$, and $\phi 3$ of three phases are applied to each combination of three transfer electrodes 24-1, 24-2, and 24-3 constituting one pixel. Thus, the potential in the channel region 22 extending below the transfer electrodes 24-1, 24-2, and 24-3 is controlled to transfer information charges.

Similarly to the image capture section 2*i*, the storage section 2*s* also includes vertical shift registers. The vertical shift registers included in the storage section 2*s* are shielded from light, and each bit of the shift registers functions as one of storage pixels that store information charges.

In addition, as shown in FIG. 6, a CCD solid state image capture device intended for capturing color images includes two types of columns of color filters: columns having red (R) transmitting filters and green (G) transmitting filters arranged alternately along the vertical transfer direction, and columns having green (G) transmitting filters and blue (B) transmitting filters arranged alternately along the vertical transfer direction. The two types of columns are arranged alternately in a direction crossing the vertical transfer direction. A matrix of pixels formed in this manner enables capture of color images.

However, in the image capture device and the control method thereof according to the above-described related art, transfer is performed by sequentially passing information charges from each pixel to the next. Therefore, such related art device and method have problems in that a long period of time is required for vertical transfer and in that a high quality image cannot be obtained.

For example, in cases where no mechanical shutter is provided for the image capture section 2*i*, in response to light continuously incident on the pixels of the image capture section 2*i*, the image capture section 2*i* continues to generate electric charges even during a period of transfer. Such electric charges may cause noise called "smear". The electric charge that causes such noise is referred to as "smear charge". The amount of smear charge increases in accordance with the increase in the length of period during which information charges are transferred from the image capture section 2*i* to the storage section 2*s*. As a result, strong noise will remain in captured images.

Further, in cases where, as in the related art, only one transfer electrode of each group of transfer electrodes in the image capture section 2*i* is turned on to capture an image, the amount of charge that can be stored in a potential well during image capture is limited. Therefore, if, for example, the image capture section 2*i* receives light coming from a high brightness subject, the available sensitivity and dynamic range may be insufficient in some cases. Still further, the amount of information charge generated during a period of image capture may exceed the capacity of a potential well, resulting in a reduced dynamic range of the captured image.

SUMMARY OF THE INVENTION

According to one aspect of the present invention, there is provided an image capture device comprising a shift register including a plurality of pixels to generate information charges in response to light coming from outside, each pixel having a plurality of transfer electrodes extending in a direction crossing a transfer direction of information charges, such that a potential well formed by function of the transfer electrodes is used to store and transfer information charges generated in response to light incident on a pixel, wherein, during image capture, information charges are stored in a plurality of potential wells substantially separated from each other, and, during transfer, information charges stored in at least two of the plurality of potential wells are combined by addition to be transferred.

According to another aspect of the present invention, there is provided a controller of an image capture device, the image capture device comprising a shift register including a plurality of pixels to generate information charges in response to light coming from outside, such that a potential well is used to store and transfer information charges generated in response to light incident on a pixel, wherein, during image capture, information charges are stored in a plurality of potential wells substantially separated from each other, and, during transfer, information charges stored in at least two of the plurality of potential wells are combined by addition to be transferred.

According to still another aspect of the present invention, there is provided an image capture device comprising a shift register including a plurality of pixels that have transfer electrodes and generate information charges in response to light coming from outside, such that information charges generated in response to light incident on a pixel are stored and transferred by function of the transfer electrodes, wherein, during image capture, information charges generated in a first on-gate period are stored in a first pixel, and information charges generated in a second on-gate period shorter than the first on-gate period are stored in a second pixel substantially separated from the first pixel, and, during transfer, information charges stored in the first pixel and the second pixel are combined by addition to be transferred.

According to still another aspect of the present invention, there is provided a controller of an image capture device, the image capture device comprising a shift register including a plurality of pixels that have transfer electrodes and generate information charges in response to light coming from outside, such that information charges generated in response to light incident on a pixel are stored and transferred by function of the transfer electrodes, wherein, during image capture, information charges generated in a first on-gate period are stored in a first pixel, and information charges generated in a second on-gate period shorter than the first on-gate period are stored in a second pixel substantially separated from the first pixel, and, during transfer, information charges stored in the first pixel and the second pixel are combined by addition to be transferred.

BRIEF DESCRIPTION OF THE DRAWINGS

Preferred embodiments of the present invention will be described in further detail based on the following drawings, wherein.

DESCRIPTION OF PREFERRED EMBODIMENT

Figure 1:
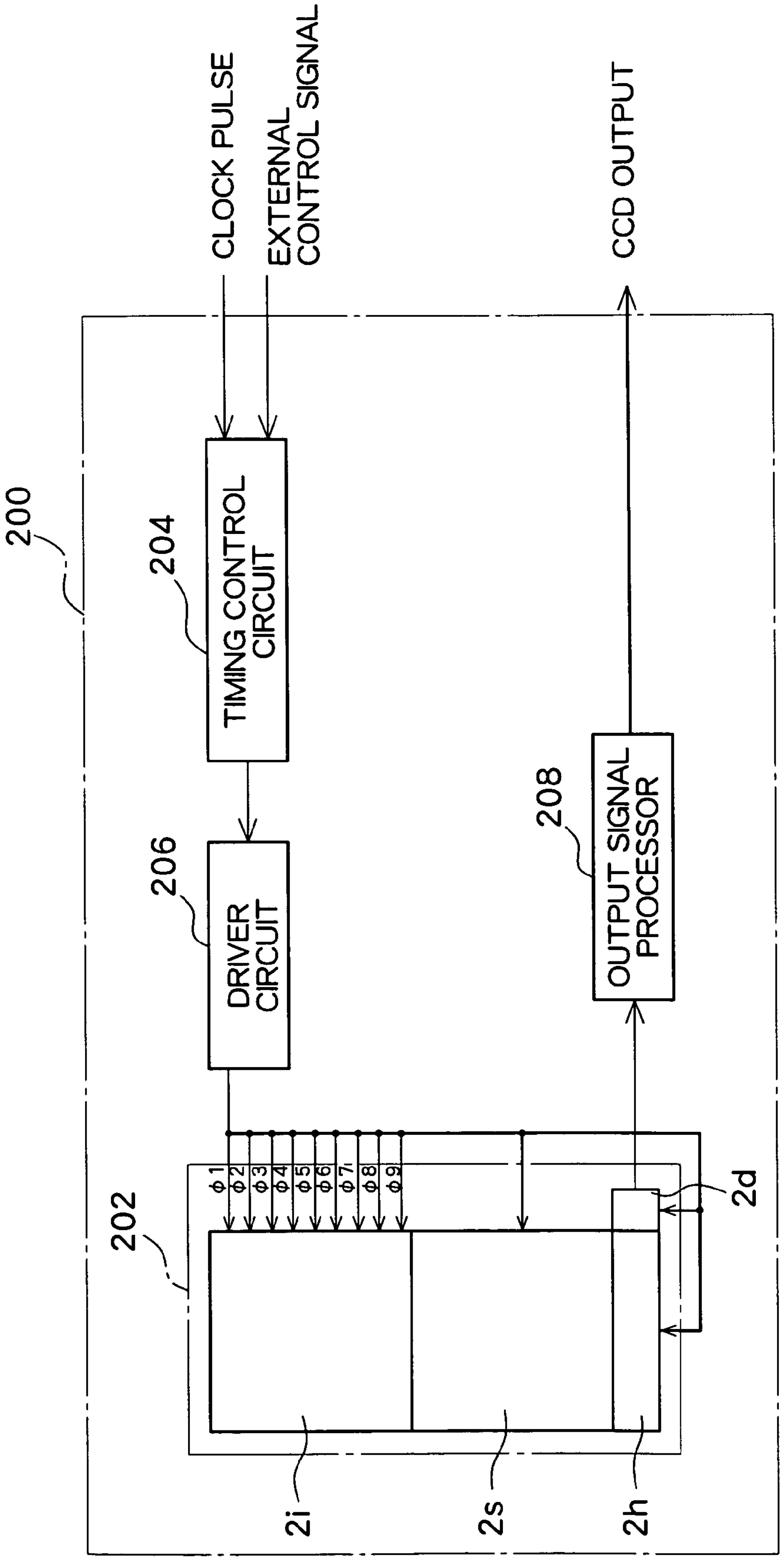
FIG. 1 is a block diagram showing a structure of an image capture device according to a preferred embodiment of the present invention.

Referring first to FIG. 1, an image capture device 200 according to a preferred embodiment of the present invention includes a CCD solid state image capture element 202, a timing control circuit 204, a driver circuit 206, and an output signal processor 208.

The CCD solid state image capture element 202 has an image capture section 2*i*, a storage section 2*s*, a horizontal transfer section 2*h*, and an output section 2*d*. In response to a clock pulse having a predetermined frequency and an external control signal, the timing control circuit 204 generates a control signal for use in controlling the image capture, vertical transfer, horizontal transfer, and output of the CCD solid state image capture element 202. The control signal is input from the timing control circuit 204 to the driver circuit 206. In response to the control signal input from the timing control circuit 204, the driver circuit 206 outputs a clock pulse at a necessary time to each of the image capture section 2*i*, the storage section 2*s*, the horizontal transfer section 2*h*, and the output section 2*d* of the CCD solid state image capture element 202. The output signal processor 208 performs processing, such as smear removal, on a signal output from the output section 2*d* of the CCD solid state image capture element 202, and then outputs an output signal to the outside of the device.

As in the related art, the image capture section 2*i* and the storage section 2*s* include vertical shift registers in which a plurality of channel regions extend in parallel with each other in a vertical direction (corresponding to the longitudinal direction of the CCD solid state image capture element 202 shown in FIG. 1) and a plurality of transfer electrodes intersect the channel regions. Each bit of the shift registers functions as one of the light receiving pixels arranged in a two-dimensional matrix.

Figure 2:
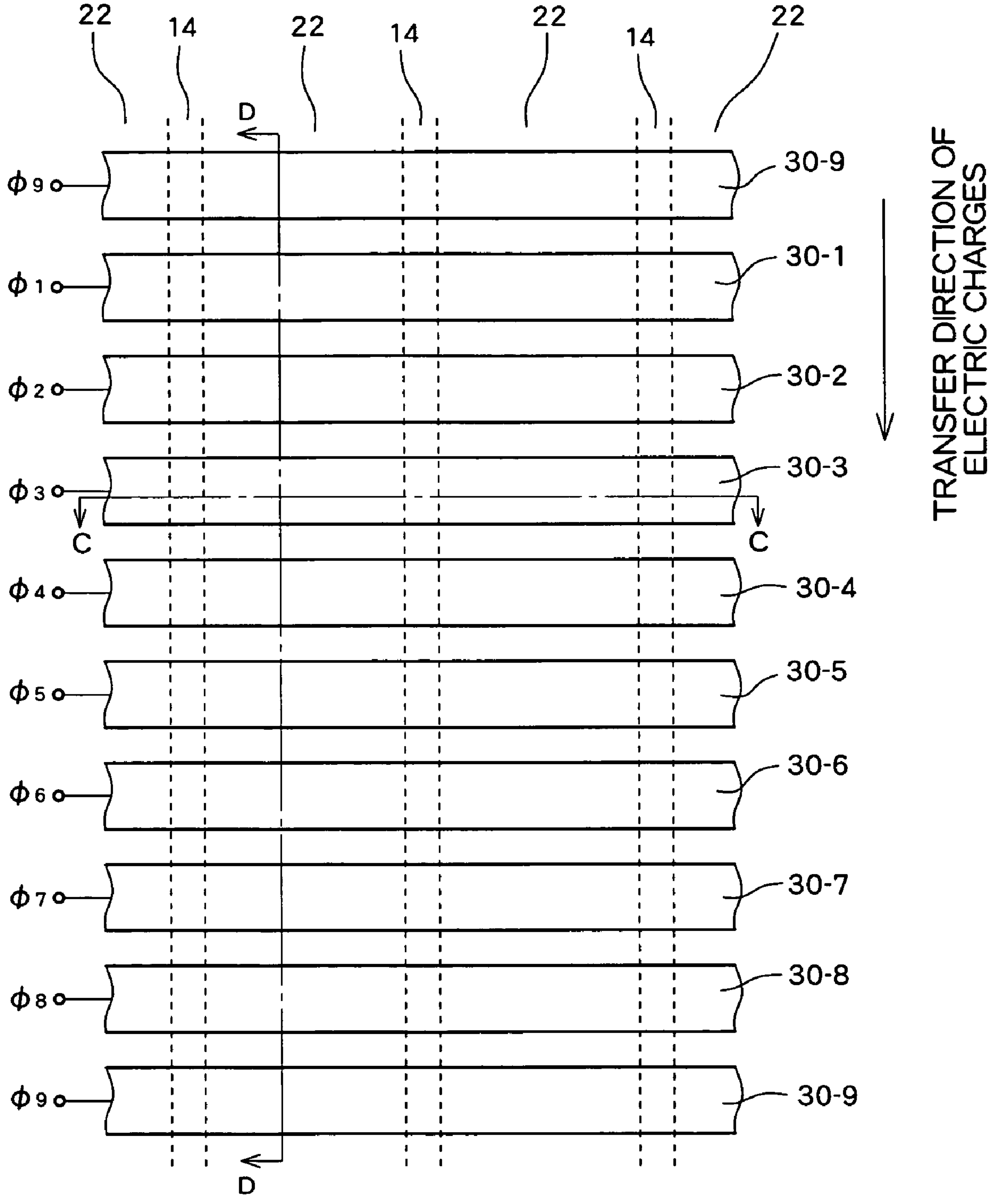
FIG. 2 is a plan view showing an internal structure of an image capture section in a CCD solid state image capture element according to the preferred embodiment of the present invention.
Figure 3:
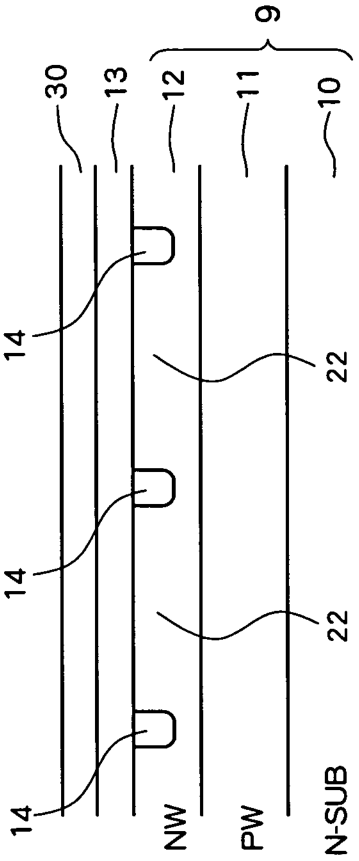
FIG. 3 is a cross-sectional view showing the internal structure of the image capture section in the CCD solid state image capture element according to the preferred embodiment of the present invention.
Figure 4:
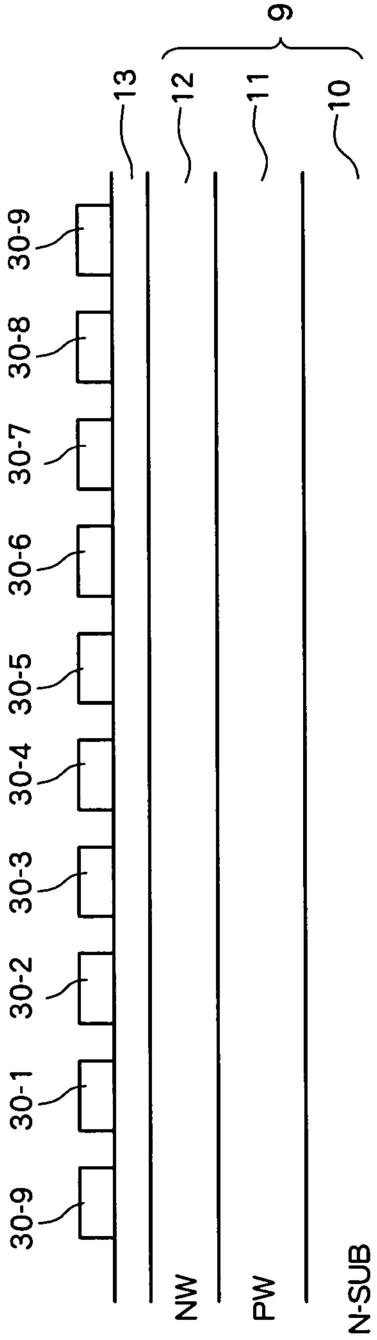
FIG. 4 is a cross-sectional view showing the internal structure of the image capture section in the CCD solid state image capture element according to the preferred embodiment of the present invention.

As shown in FIGS. 2 to 4, the image capture section 2*i* has a structure in which a plurality of shift registers are formed in a surface region of a semiconductor substrate 10. FIG. 2 is a schematic plan view showing a part of the image capture section 2*i*, and FIGS. 3 and 4 are cross-sectional side views taken along lines C-C and D-D, respectively, of FIG. 2.

As shown in FIGS. 3 and 4, the image capture section 2*i* according to the present embodiment has a similar cross-sectional structure to that of the image capture section of the above-described related art image capture device. Specifically, a P well (PW) 11 is formed in the n-type semiconductor substrate 9. An N well 12 highly doped with an n-type impurity is formed in a surface region on the P well 11. In addition, separation regions 14 consisting of p-type impurity regions are formed in parallel with each other at predetermined intervals in the N well 12. The separation regions 14 form potential barriers between adjacent channel regions. The regions intervening between the separation regions 14 are electrically separated so that each intervening region constitutes a channel region 22, that is, a transfer path for transferring information charges.

An insulating film 13 is formed on the surface of the semiconductor substrate 9. As shown in FIG. 2, a plurality of transfer electrodes 30 (for example, 30-1 to 30-9) formed of polysilicon films or the like are repeatedly arranged in parallel with each other so as to cross the extending direction of the channel regions 22 at right angles, with the insulating film 13 being interposed between the channel regions 22 and the transfer electrodes 30.

Figure 5:
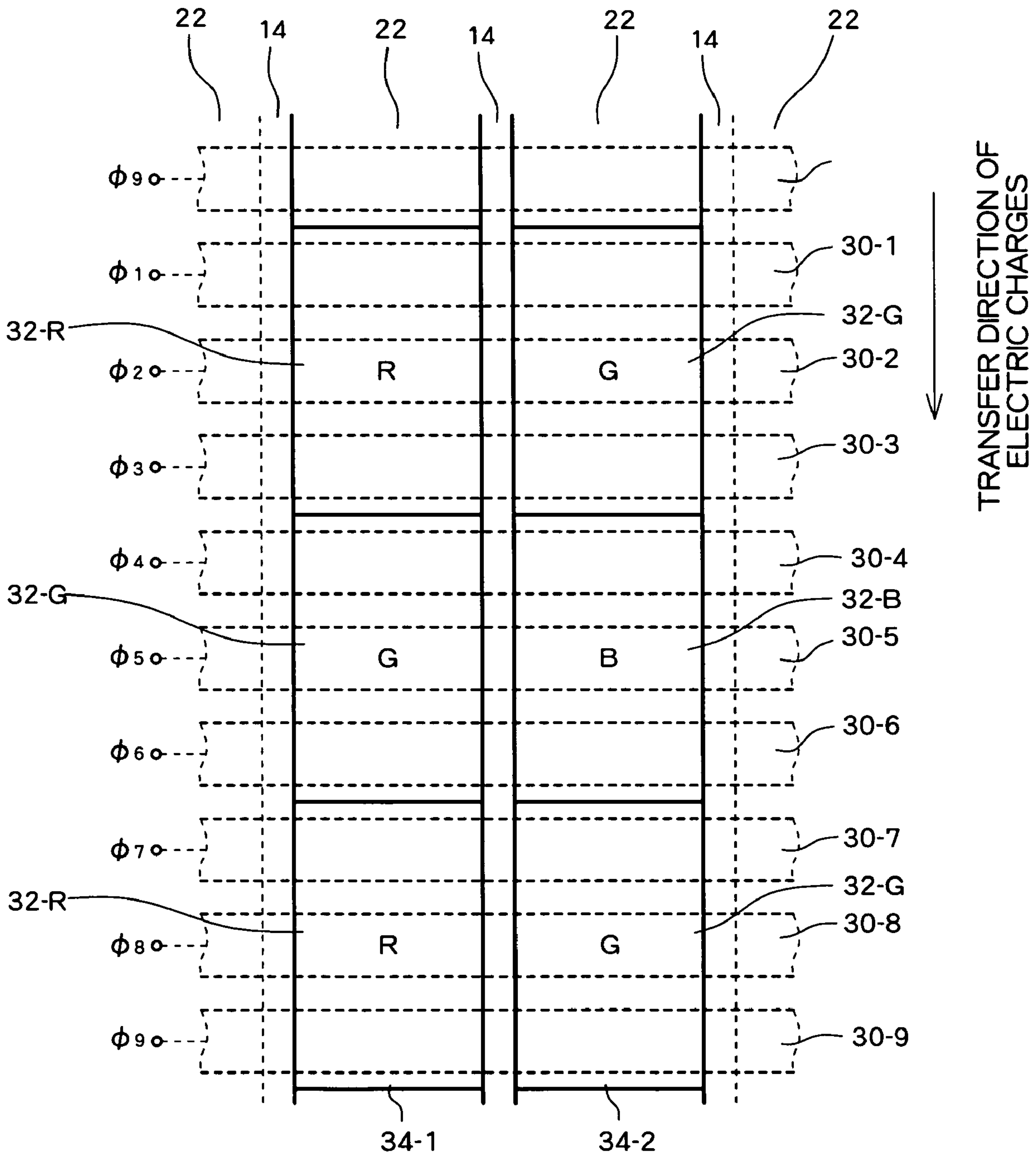
FIG. 5 shows an arrangement of color filters in the CCD solid state image capture element according to the preferred embodiment of the present invention.
Figure 6:
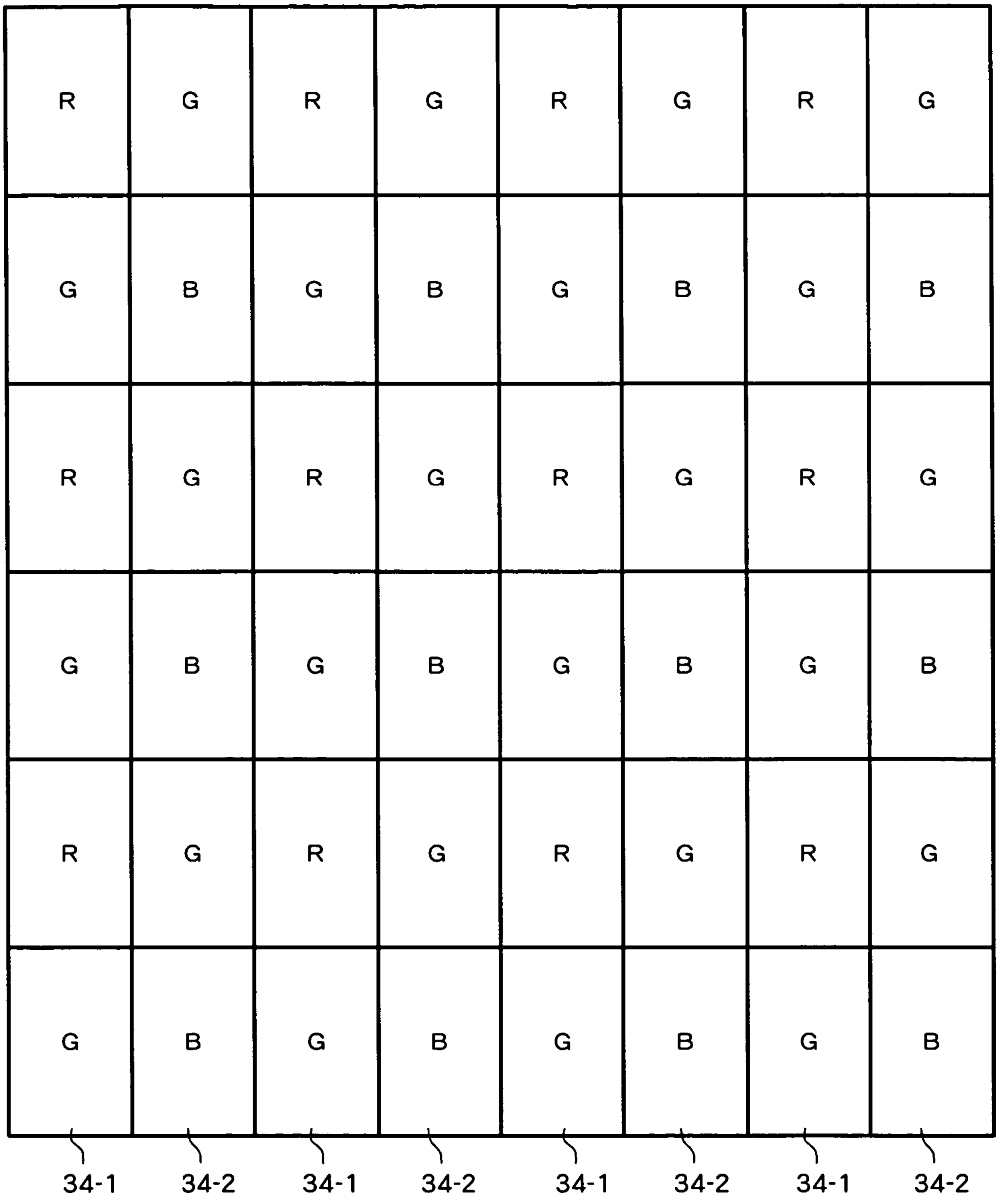
FIG. 6 shows a matrix of color filters in the CCD solid state image capture element according to the preferred embodiment of the present invention.

The present embodiment will be described below with reference to an image capture device 200 configured to capture color images. The image capture device 200 configured to capture color images has a matrix of pixels repeatedly arranged at predetermined intervals in which the pixels generate and store information charges in response to wavelength components corresponding to different colors. For example, as shown in FIG. 5, two types of columns of color filters are provided: a column 34-1 has red (R) transmitting filters 32-R and green (G) transmitting filters 32-G arranged alternately along the vertical transfer direction, and a column 34-2 has blue (B) transmitting filters 32-B and green (G) transmitting filters 32-G arranged alternately along the vertical transfer direction, in which each filter covers a group of three successive transfer electrodes. The two types of columns are arranged alternately in a direction crossing the vertical transfer direction. Thus, a matrix of pixels as shown in FIG. 6 is formed such that each of the R, G, and B pixels is controlled by a plurality of (in this example, three) electrodes.

With reference to the related art image capture section 2*i*, a group of three adjacent transfer electrodes 24-1, 24-2, and 24-3 constitutes one pixel. Clock pulses φ1, φ2, and φ3 having three phases are supplied to respective transfer electrodes 24-1, 24-2, and 24-3 in order to control the image capture and transfer of the image capture section 2*i*. In contrast, according to the present embodiment, with reference to a group of pixels included in a cycle created by adding one pixel to a cycle of pixels corresponding to a wavelength range (color) arranged along the transfer direction, different clock pulses are supplied to respective transfer electrodes included in one group of pixels to control the image capture section 2*i*. For example, referring to the arrangement of pixels shown in FIG. 5, because pixels corresponding to a wavelength range representing the same color (R, G, or B) are arranged in a cycle of two pixels along the transfer direction, a group of transfer electrodes constituting three pixels, which is determined by adding one pixel to two pixels, is used as a unit to perform control. More specifically, with reference to a group of nine successive transfer electrodes 30-1 to 30-9 along the transfer direction, different clock pulses are supplied to the respective transfer electrodes 30-1 to 30-9. By independently controlling the transfer electrodes 30-1 to 30-9 arranged in three successive pixels along the transfer direction in this manner, the image capture and transfer in the image capture section 2*i* are controlled.

Figure 7:
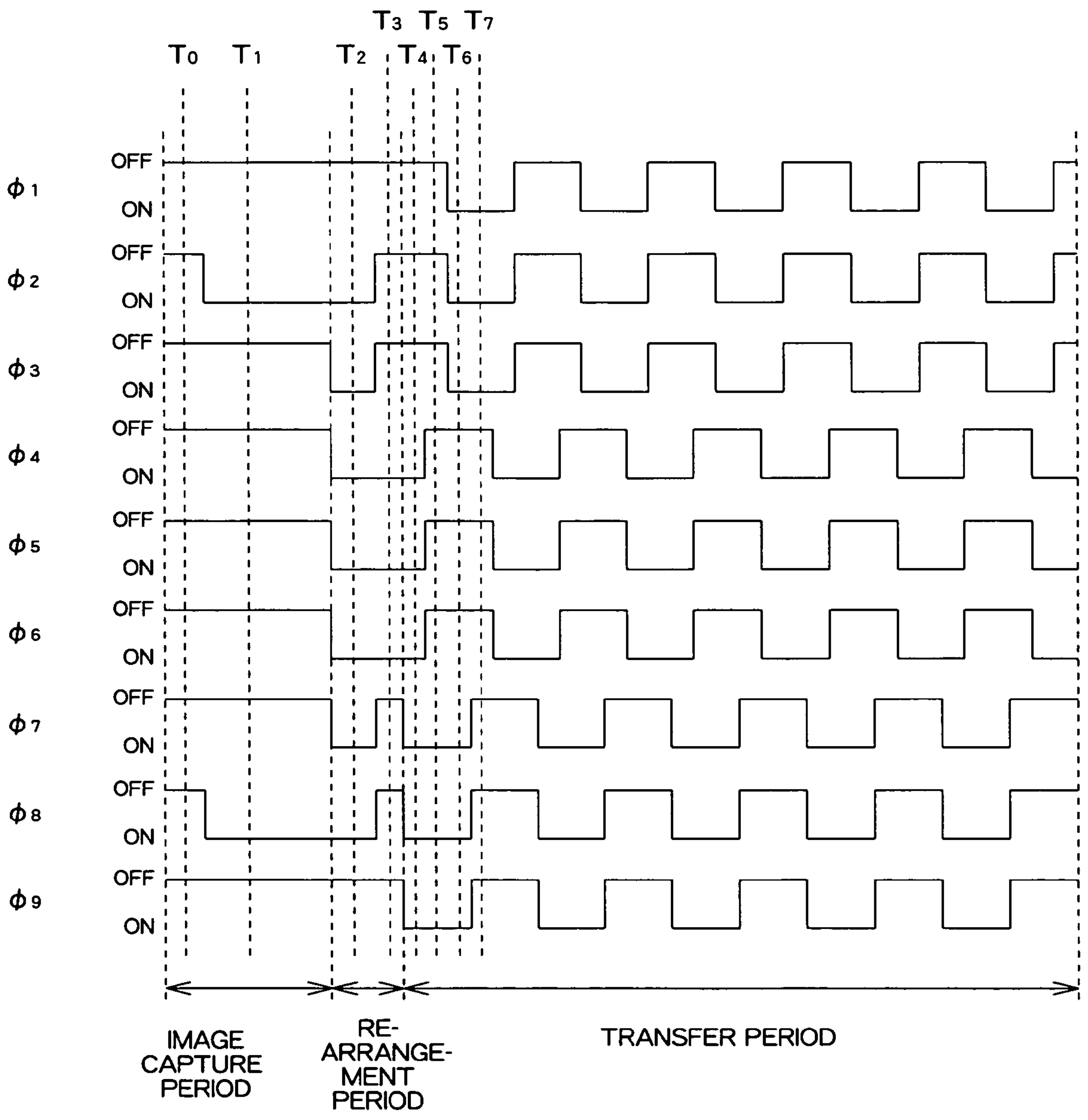
FIG. 7 is a timing chart showing clock pulses supplied to the CCD solid state image capture element according to the preferred embodiment of the present invention.
Figure 8:
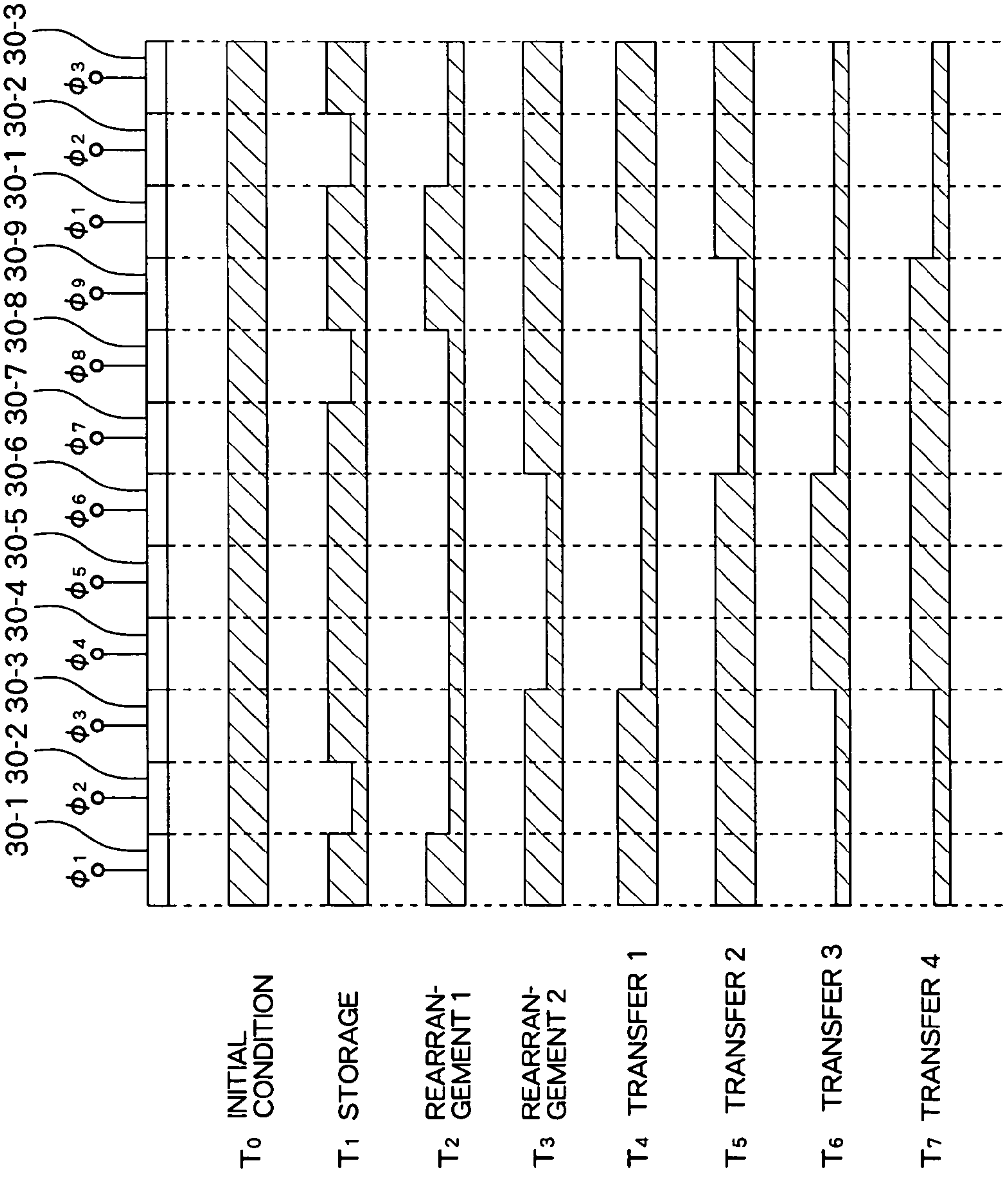
FIG. 8 shows changes in state of potential occurring below transfer electrodes according to the preferred embodiment of the present invention.

The image capture (storage of information charges) and transfer of information charges in the image capture device 200 are performed by controlling the voltage applied to the transfer electrodes 30-1 to 30-9 using the timing control circuit 204. Referring now to FIG. 7, that is, a timing chart showing clock pulses for periods from image capture to transfer, control of the transfer electrodes will be described below. Further, FIG. 8 shows a state of changes in potential occurring below the transfer electrodes 30-1 to 30-9 from time $T_0$ to time $T_7$. In this chart, the horizontal axis indicates positions along the transfer direction in the image capture section 2*i*, and the vertical axis indicates potentials at the respective positions. The lower side in this chart represents a positive potential, and the upper side represents a negative potential.

The driver circuit 206 receives a control signal from the timing control circuit 204, and applies clock pulses $\phi_1$ to $\phi_9$ to the transfer electrodes 30-1 to 30-9, respectively. An n-type semiconductor substrate (N-SUB) 10 of the CCD solid state image capture element 202 is fixed to a substrate potential $V_{sub}$.

Time $T_0$ corresponds to an initial condition before image capture. At this time, all clock pulses $\phi_1$ to $\phi_9$ are turned off so that, as shown in FIG. 8, no potential well is formed below the transfer electrodes 30-1 to 30-9, and electric charges are discharged to the substrate 10.

At time $T_1$, the clock pulses are controlled so that a potential well is formed in a pixel positioned at each end of a group of pixels used as a unit. At this time, the clock pulses $\phi_2$ and $\phi_8$ are turned on so that potential wells are formed below the transfer electrodes 30-2 and 30-8. Information charges generated in response to incident light around the turned-on transfer electrodes 30-2 and 30-8 are stored in these potential wells.

According to the present embodiment, a group of pixels included in a cycle created by adding one pixel to a cycle of pixels corresponding to the same wavelength range arranged along the transfer direction is used as a unit, and control is performed by applying independent clock pulses to the respective transfer electrodes included in each group of pixels. Thus, one group of pixels store information charges generated in response to the same wavelength component. For example, with reference to the column 34-1 of the CCD solid state image capture element 202 as shown in FIG. 5, a group of R, G, and R, and a group of G, R, and G are arranged repeatedly from the left as shown in FIG. 8. In this column, groups of R, G, and R store information charges generated in response to red wavelength components in pixels corresponding to red (R) positioned at both ends of each group, and groups of G, R, and G store information charges generated in response to green wavelength components in pixels corresponding to green (G) positioned at both ends of each group. The same is true for the other columns.

Figure 9:
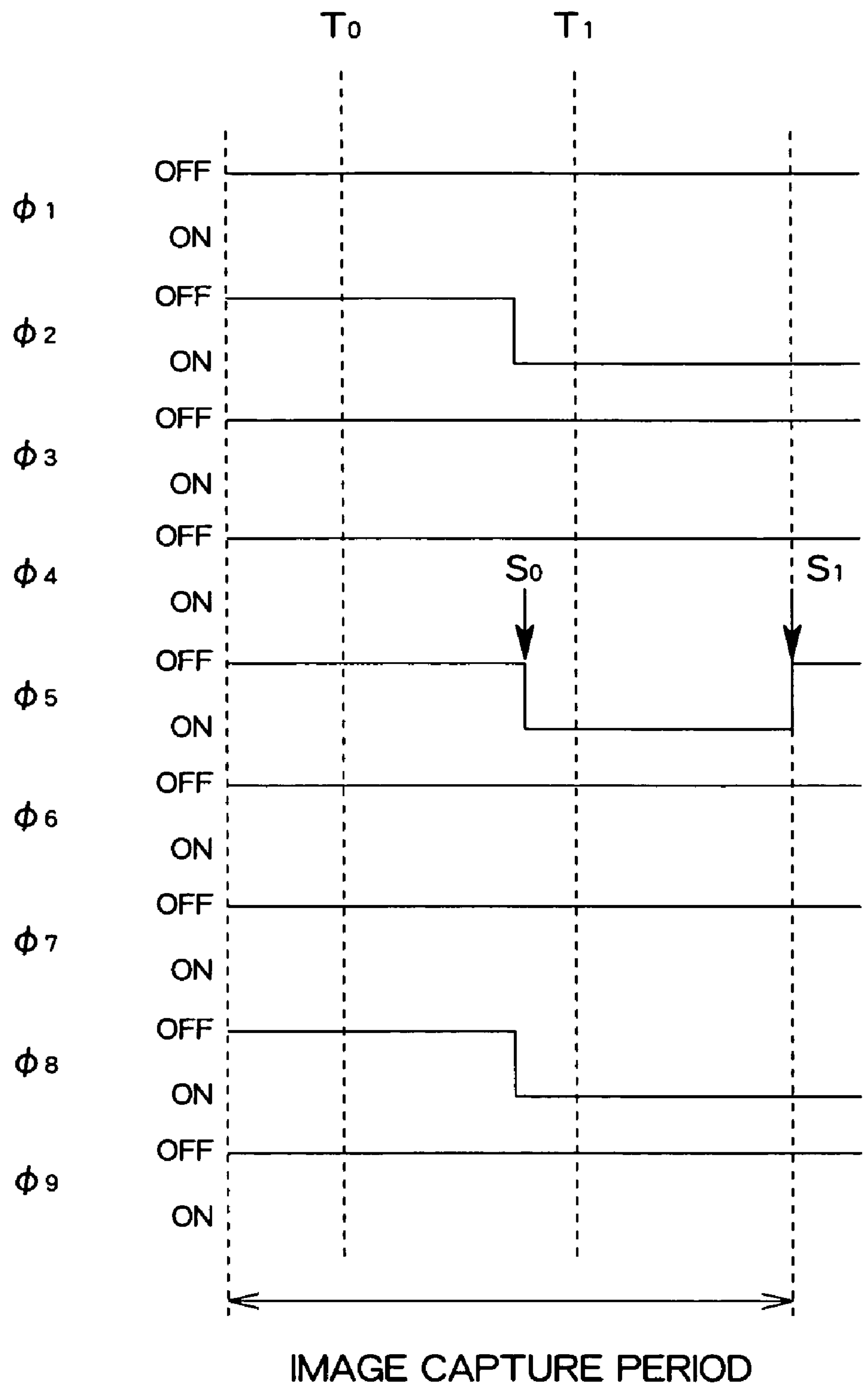
FIG. 9 is another example of a timing chart showing clock pulses supplied to the CCD solid state image capture element according to the preferred embodiment of the present invention.

Although, in this example embodiment, the clock pulses applied to the pixels other than those positioned at both ends of each group are maintained off during image capture to control so that information charges are always discharged to the substrate 10, the present invention is not limited to such an embodiment. For example, as shown in FIG. 9, in addition to the clock pulses $\phi_2$ and $\phi_8$, the clock pulse $\phi_5$ can be temporarily turned on from time $S_0$ to store information charges. To discharge the stored information charges, the clock pulse $\phi_5$ can be reset off at time $S_1$, at which the image capture is to be finished. In this manner, electronic shutter operation can be performed.

At times $T_2$ and $T_3$, information charges are rearranged. Information charges that are stored in the potential wells of the pixels positioned at both ends of one group of pixels are collected to be stored in a single potential well. At time $T_2$, in addition to the clock pulses $\phi_2$ and $\phi_8$ the clock pulses $\phi_3$ to $\phi_7$ are turned on to combine by addition the information charges stored in the potential wells formed below the transfer electrodes 30-2 and 30-8. Then, at time $T_3$, the clock pulses $\phi_2$, $\phi_3$, $\phi_7$, and $\phi_8$ are turned off to rearrange the information charges in a potential well formed below the transfer electrodes 30-4 to 30-6.

During image capture, by thus collecting and rearranging, in a single potential well, information charges stored in at least two or more pixels of one group of pixels, the sensitivity and dynamic range for image capture can be increased.

During a period from time $T_4$, information charges collected in a single potential well provided for each group of pixels are transferred. In this period, in-phase clock pulses are supplied to at least two transfer electrodes successive along the transfer direction to transfer the information charges. In this example embodiment, in-phase clock pulses are supplied to each group of three transfer electrodes provided for each pixel to perform transfer.

For example, with reference to the CCD solid state image capture element 202 shown in FIG. 5, the clock pulses in each group $\phi_1$ to $\phi_3$, $\phi_4$ to $\phi_6$, and $\phi_7$ to $\phi_9$ are respectively driven at the same phase, as shown in FIG. 7, so that information charges are sequentially transferred using groups of transfer electrodes 30-1 to 30-3, 30-4 to 30-6, and 30-7 to 30-9 arranged successively as shown in FIG. 8, each group being a unit of transfer.

More specifically, as shown in FIG. 7, the clock pulses $\phi_1$ to $\phi_3$ are turned off and the clock pulses $\phi_4$ to $\phi_9$ are turned on at time $T_4$, and the clock pulses $\phi_1$ to $\phi_6$ are turned off and the clock pulses $\phi_7$ to $\phi_9$ are turned on at time $T_5$. As a result, the information charges stored in the potential well formed below the transfer electrodes 30-4 to 30-6 are transferred to a new potential well formed below the transfer electrodes 30-7 to 30-9, as shown in FIG. 8. The clock pulses $\phi_4$ to $\phi_6$ are turned off and the clock pulses $\phi_1$ to $\phi_3$ and $\phi_7$ to $\phi_9$ are turned on at time $T_6$, and the clock pulses $\phi_4$ to $\phi_9$ are turned off and the clock pulses $\phi_1$ to $\phi_3$ are turned on at time $T_7$. As a result, the information charges stored in the potential well formed below the transfer electrodes 30-7 to 30-9 are transferred to a new potential well formed below the transfer electrodes 30-1 to 30-3, as shown in FIG. 8. As described above, information charges can be sequentially transferred through sequential applications of in-phase clock pulses to each group of transfer electrodes provided in one pixel. Also, information charges stored in the other columns are transferred in a similar manner.

Figure 10:
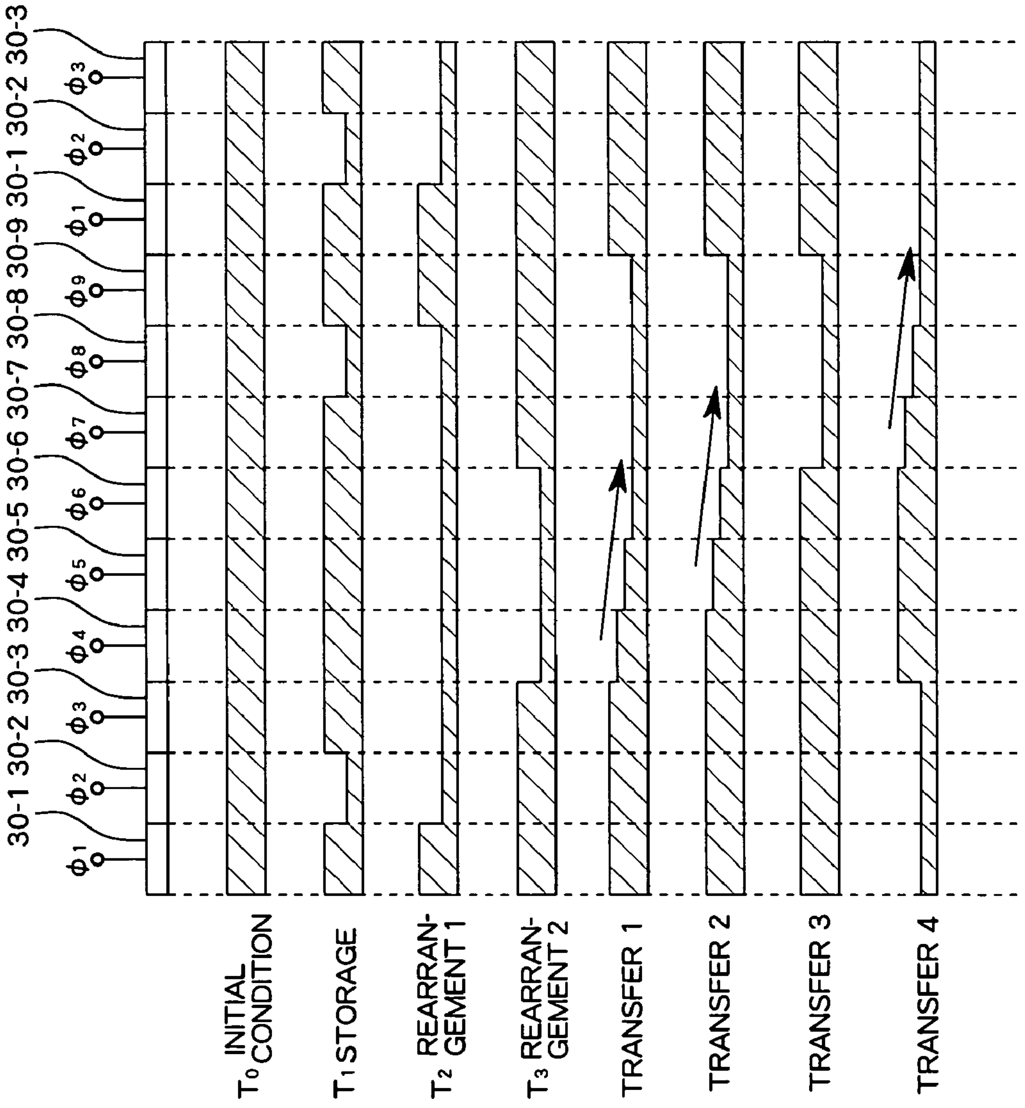
FIG. 10 shows changes in state of potential occurring below the transfer electrodes of the CCD solid state image capture element according to the preferred embodiment of the present invention.

It should also be noted that although the clock pulses in each group $\phi_1$ to $\phi_3$, $\phi_4$ to $\phi_6$, and $\phi_7$ to $\phi_9$ are respectively driven at the same phase in the above-described embodiment, the present invention only requires that the clock pulses be driven at substantially the same phase. In order that the potential may vary smoothly along the transfer direction as shown in FIG. 10, delayed clock pulses in each group may be supplied to the respective transfer electrodes. By thus supplying delayed clock pulses, it is possible to smoothly transfer information charges.

As described above, during transfer, a group of at least two successive pixels arranged along the transfer direction is used as a unit, and individual transfer electrodes provided in each group of pixels used as a unit are controlled independently. Further, each group of at least two successive transfer electrodes arranged along the transfer direction is used as a unit, and, during transfer, clock pulses having substantially the same phase are supplied to each group of transfer electrodes used as a unit. Therefore, information charges stored in at least two of a plurality of potential wells can be combined by addition along the transfer direction to transfer information charges. Therefore, information charges can be transferred from the image capture section 2*i* at high speed. As a result, the smear that occurs during transfer can be reduced. For example, as in the above-described embodiment, when control is performed using a group of three transfer electrodes as a unit, information charges can be transferred at a transfer speed of about three times that achieved in the related art control method. In an image capture device that is intended for obtaining color images, during transfer, information charges stored in at least two pixels that generate information charges in response to light of the same wavelength range are combined by addition to transfer information charges. In a particular case where pixels corresponding to each wavelength range are repeatedly arranged at predetermined intervals along the transfer direction, a group of pixels included in a cycle created by adding one pixel to a cycle of arranged pixels that correspond to the same wavelength range is used as a unit, and individual transfer electrodes provided in each group of pixels used as a unit are controlled independently. A similar transfer method can also be applied to the storage section 2*s*.

As described above, according to the present embodiment, the sensitivity and dynamic range during image capture in an image capture device including a CCD solid state image capture element can be increased, and, in other words, high quality images can be obtained.

In the present embodiment, a group of nine successive transfer electrodes 30-1 to 30-9 is used as a unit, and clock pulses having different phases are supplied to the transfer electrodes 30-1 to 30-9, respectively, thereby controlling the image capture (storage of information charges) and transfer of information charges in the image capture section 2*i*. However, the present invention is not limited to such an embodiment. It is also possible that, as in the related art, each group of transfer electrodes constituting one pixel, such as groups of transfer electrodes 30-1 to 30-3, 30-4 to 30-6, and 30-7 to 30-9, is used as a unit so that the image capture section 2*i* is controlled by supplying in-phase clock pulses to the corresponding transfer electrodes in each group, that is, to the transfer electrodes 30-1, 30-4, and 30-7, to the transfer electrodes 30-2, 30-5, and 30-8, and to the transfer electrodes 30-3, 30-6, and 30-9. Thus, by switching between two modes of control in one of which a group of transfer electrodes spanning a plurality of successive pixels is used as a unit, and in the other of which a group of transfer electrodes constituting one pixel is used as a unit, it is also possible to capture and transfer images while switching between the low resolution but high speed transfer and the high resolution but low speed transfer.

Further, even in cases where the image capture section 2*i* is provided with a mechanical shutter, when low resolution images are continuously transferred at high speed, such as for motion pictures, it is possible to capture images continuously with the shutter held open. In such cases, it is not essential that, as with the related art example, the storage section 2*s* have the same number of pixels arranged as in the image capture section 2*i*. Storage pixels in the storage section 2*s* can also be grouped to form an arrangement of larger pixels each of which has a capacity sufficient to store information charges combined by addition. For example, when the image capture section 2*i* stores information charges in units of three pixels arranged along the transfer direction, because three pixels arranged along the transfer direction in the storage section 2*s* can be grouped into one pixel, the number of pixels can be reduced to one third of that in the related art example. As a result, because the storage section 2*s* can include a smaller number of pixels than the related art example, the CCD solid state image capture element 202 can have a smaller structure. In addition, because the number of transfer electrodes included in the storage section 2*s* is also reduced, the control can be simplified. On the other hand, in some cases where it is desired that a still image is captured at high-resolution, image capture is performed in units of one pixel including three transfer electrodes in a similar manner to the related art example, the mechanical shutter is closed at the time of completion of the image capture, and then information charges are sequentially transferred from the image capture section 2*i* directly to the horizontal transfer section 2*h*. An image having a high-resolution can also be obtained in this manner.

Further, although the control is performed by supplying nine different clock pulses to each group of nine transfer electrodes in the above-described embodiment, the present invention is not limited to such an embodiment. For example, the number of controllable clock pulses can also be increased so that a more compressed image can be transferred at a higher speed.

Still further, although the present embodiment has been described with reference to an image capture device including a frame transfer type CCD solid state image capture element, the scope of applications of the present invention is not limited to such a device. For example, the present invention can also be applied to an image capture device including an interline transfer type CCD solid state image capture element.

Modified Example 1

In the above-described embodiment, only pixels positioned at both ends of a group of pixels that is used as a unit during image capture are used to store information charges, and the information charges stored therein are collectively transferred. In contrast, as will be described below, pixels other than the pixels positioned at both ends of a group of pixels can also be used to store information charges, and the information charges stored therein can be collectively transferred.

Figure 11:
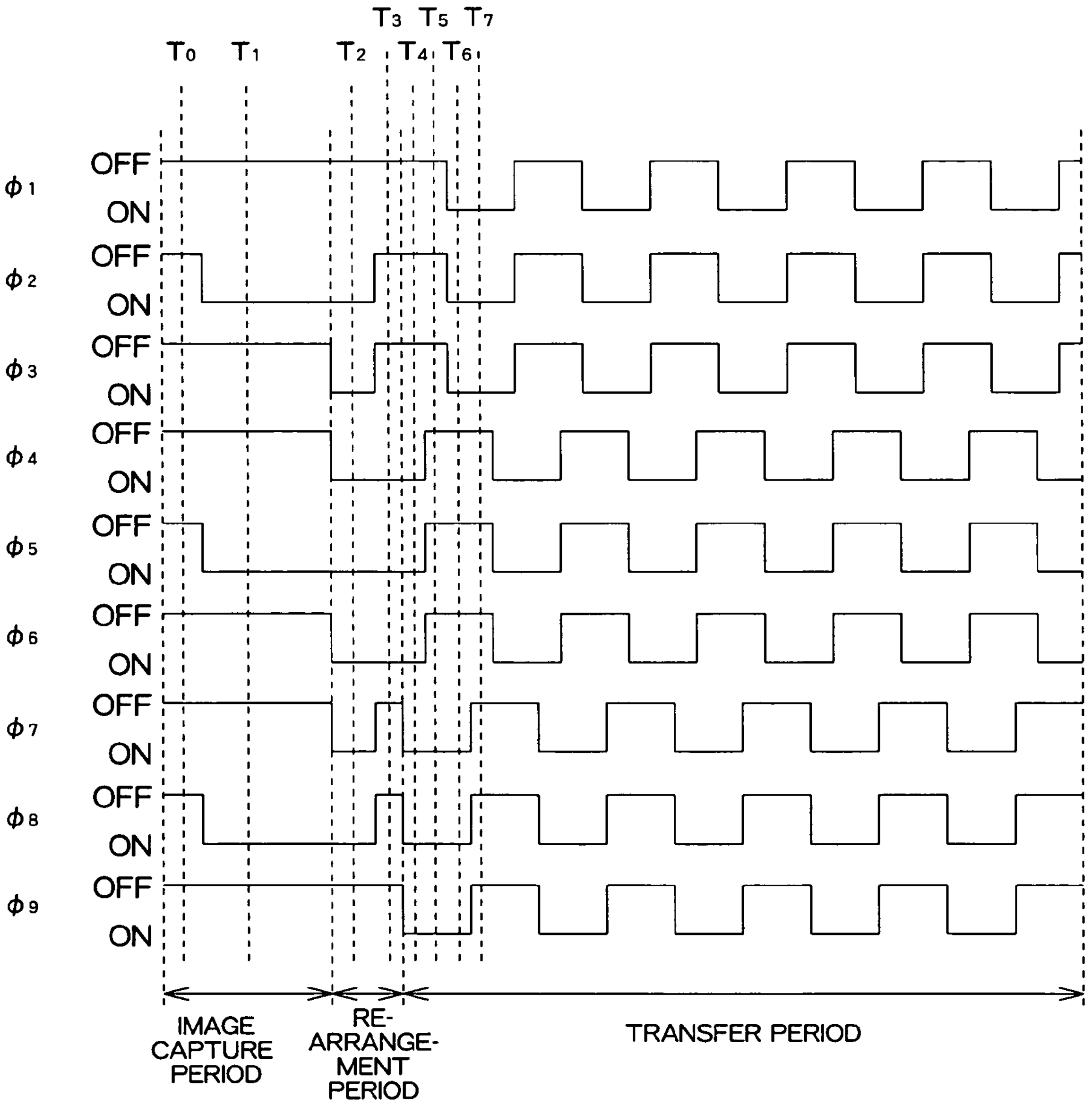
FIG. 11 is a timing chart showing clock pulses supplied to a CCD solid state image capture element according to a first modification example.
Figure 12:
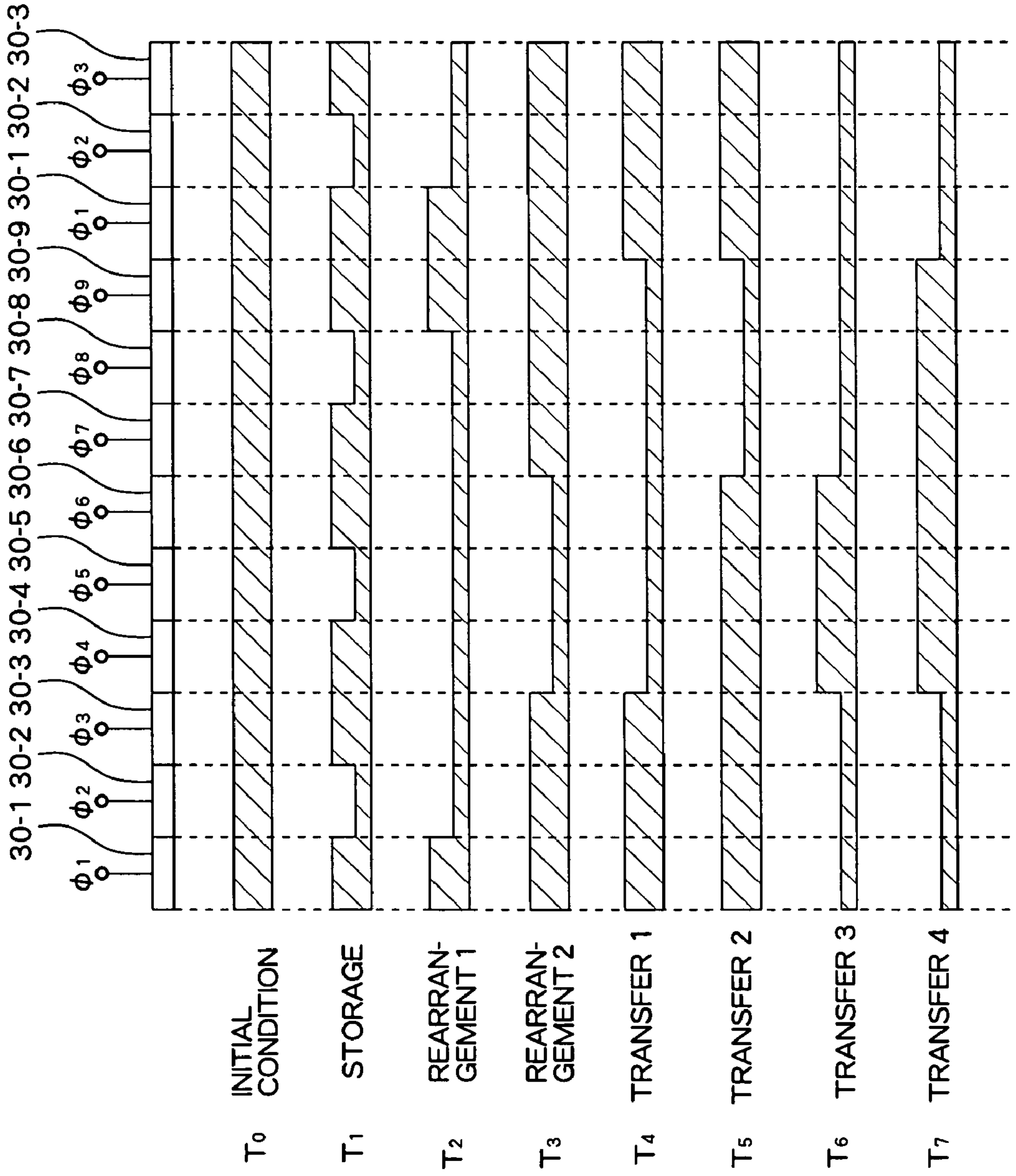
FIG. 12 shows changes in state of potential occurring below transfer electrodes according to the first modification example.

Referring now to FIG. 11, that is, a timing chart showing clock pulses for periods from image capture to transfer, control of the transfer electrodes will be described below. Further, FIG. 12 shows a state of changes in potential occurring below the transfer electrodes 30-1 to 30-9 from time $T_0$ to time $T_7$. In this chart, the horizontal axis indicates positions along the transfer direction in the image capture section 2*i*, and the vertical axis indicates potentials at the respective positions. The lower side in this chart represents a positive potential, and the upper side represents a negative potential.

The driver circuit 206 receives a control signal from the timing control circuit 204, and applies independently controllable clock pulses $\phi_1$ to $\phi_9$ to the transfer electrodes 30-1 to 30-9, respectively. An n-type semiconductor substrate (N-SUB) 10 of the CCD solid state image capture element 202 is fixed to a substrate potential $V_{sub}$.

At time $T_0$, all clock pulses $\phi_1$ to $\phi_9$ are turned off so that, as shown in FIG. 12, no potential well is formed below the transfer electrodes 30-1 to 30-9, and electric charges are discharged to the substrate 10.

At time $T_1$, the clock pulses are controlled so that potential wells are formed in all pixels included in a group of pixels that is used as a unit. At this time, the clock pulses $\phi_2$, $\phi_5$, and $\phi_8$ are turned on so that potential wells are formed below the transfer electrodes 30-2, 30-5, and 30-8. Information charges generated in response to incident light around the turned-on transfer electrodes 30-2, 30-5, and 30-8 are stored in these potential wells.

For example, with reference to the column 34-1 of the CCD solid state image capture element 202 as shown in FIG. 5, a group of R, G, and R, and a group of G, R, and G are arranged repeatedly from the left as shown in FIG. 12. Therefore, in this column, groups of R, G, and R store information charges generated in response to red, green, and red wavelength components in pixels corresponding to red (R), green (G), and red (R), respectively, and groups of G, R, and G store information charges generated in response to green, red, and green wavelength components in pixels corresponding to green (G), red (R), and green (G), respectively.

At times $T_2$ and $T_3$, information charges are rearranged. Information charges that are stored in the potential wells of the pixels positioned at both ends of one group of pixels are collected to be stored in a single potential well. At time $T_2$, in addition to the clock pulses $\phi_2$, $\phi_5$, and $\phi_8$, the clock pulses $\phi_3$, $\phi_4$, $\phi_6$, and $\phi_7$ are turned on to combine by addition the information charges stored in the potential wells formed below the transfer electrodes 30-2, 30-5, and 30-8. Then, at time $T_3$, the clock pulses $\phi_2$, $\phi_3$, $\phi_7$, and $\phi_8$ are turned off to rearrange the information charges in a potential well formed below the transfer electrodes 30-4 to 30-6.

From then on, the information charges can be transferred in a similar manner to that during the period from time $T_4$ in the above-described embodiment. Thus, information charges stored in one group of pixels are output from the output section **2*d* in the form of a combined image signal obtained by combining, by addition, the information charges corresponding to different wavelength components (colors). The output signal processor 208** performs color separation processing on the combined image signal.

In this example, when a group of pixels used as a unit are collectively referred to as row "a", combined image signals obtained from row "a" and row "a+1" included in the same column have signal values indicating that the same wavelength components (colors) are mixed at different mixing ratios. Such characteristics are used in color separation performed by the output signal processor 208.

In the following description, a signal value corresponding to a pixel located at row $\alpha$ and column $\beta$ in the image capture section **2*i* is expressed as R ($\alpha$, $\beta$), G ($\alpha$, $\beta$), or B ($\alpha$, $\beta$) in accordance with the color of the pixel, red (R), green (G), or blue (B). With reference to an output image signal obtained from row "a", an image signal value corresponding to column "b" in the image capture section 2*i*** is expressed as D (a, b).

With reference to the arrangement of pixels shown in FIG. 6, the following four types of image signal values, each of which has a different mixing ratio of colors from the others, are obtained by combining signal values by addition:

$$D(2\lambda-1,2\mu-1)=R(6\lambda-5,2\mu-1)+G(6\lambda-4,2\mu-1)+R(6\lambda-3,2\mu-1) \tag{1}$$

$$D(2\lambda,2\mu-1)=G(6\lambda-2,2\mu-1)+R(6\lambda-1,2\mu-1)+G(6\lambda,2\mu-1) \tag{2}$$

$$D(2\lambda-1,2\mu)=G(6\lambda5,2\mu)+B(6\lambda-4,2\mu)+G(6\lambda-3,2\mu) \tag{3}$$

$$D(2\lambda,2\mu)=B(6\lambda-2,2\mu)+G(6\lambda-1,2\mu)+B(6\lambda,2\mu) \tag{4}$$

(where $\lambda$ and $\mu$ are natural numbers.)

The output signal processor 208 uses color mixture signal values obtained by the above equations (1) to (4) to generate image signals separated for each color component R, G, or B. The equations (1) and (2) are used for the odd-numbered columns, and the equations (3) and (4) are used for the even-numbered columns. Information charges obtained from two groups of pixels, or, in this example, six pixels that are successive in the direction of columns are used to determine a color component signal value at a sampling point corresponding to a position in a pixel area of those pixels.

As an example of the color separation processing, a process performed on a pixel area of six successive pixels included in an odd-numbered column will be described below. In accordance with the expression in the equations (1) and (2), the pixel area for which the process is performed is defined as an area of six pixels located from row "6λ−5" to row "6λ" in column "2μ−1". The output signal processor 208 determines an R signal value <R> $(\equiv<R\ (2\lambda-1,\ 2\mu-1)>)$ and a G signal value <G> $(\equiv<G\ (2\lambda-1,\ 2\mu-1)>)$ at a sampling point P $(2\lambda-1, 2\mu-1)$ representative of the target pixel area. In this process, under the approximation that R and G values for this particular pixel area are assumed to be constant values <R> and <G>, respectively, the equations (1) and (2) can be rewritten as the following equations (5) and (6):

$$D(2A-1,2\mu-1)=<G>+2<R> \tag{5}$$

$$D(2\lambda,2\mu-1)=2<G>+<R> \tag{6}$$

From these equations, the signal values <G> and <R> at the sampling point for the pixel area can be determined using the following equations (7) and (8), respectively.

$$<G>=[2D(2\lambda,2\mu-1)-D(2\lambda-1,2\mu-1)]/3 \tag{7}$$

$$<R>=[2D(2\lambda-1,2\mu-1)-D(2\lambda,2\mu-1)]/3 \tag{8}$$

The output signal processor 208 uses the equations (7) and (8) to calculate the values <G> and <R>. Similarly, B and G signal values <B> and <G> at a sampling point P $(2\lambda-1, 2\mu)$ for a pixel area of six pixels located from row "6λ−5" to row "6λ" in an even-numbered column (column "2μ") are determined based on the equations (3) and (4). In this manner, a set of signal values <G> and <R>, or a set of signal values <B> and <G> is obtained for each respective column from row "2λ−1" and row "2μ" of combined image signals.

Further, in a similar manner, a set of signal values <G> and <R>, or a set of signal values <B> and <G> is also obtained for each respective column from row "2λ" and row "2λ+1" of combined image signals. Because, as described above, during color separation, pairs of rows of combined image signals to be used in the color separation are shifted row by row, an equivalent number of rows of color component signals to the number of rows of combined image signals are obtained.

Modification Example 2

Further, control of an image capture device according to the above-described embodiment can also be applied so that, even when incident light is so strong that information charges generated during image capture exceed the level of saturation of a potential well, it is possible to determine the ideal amount of information charge that should be obtained if the potential well is not saturated.

Figure 13:
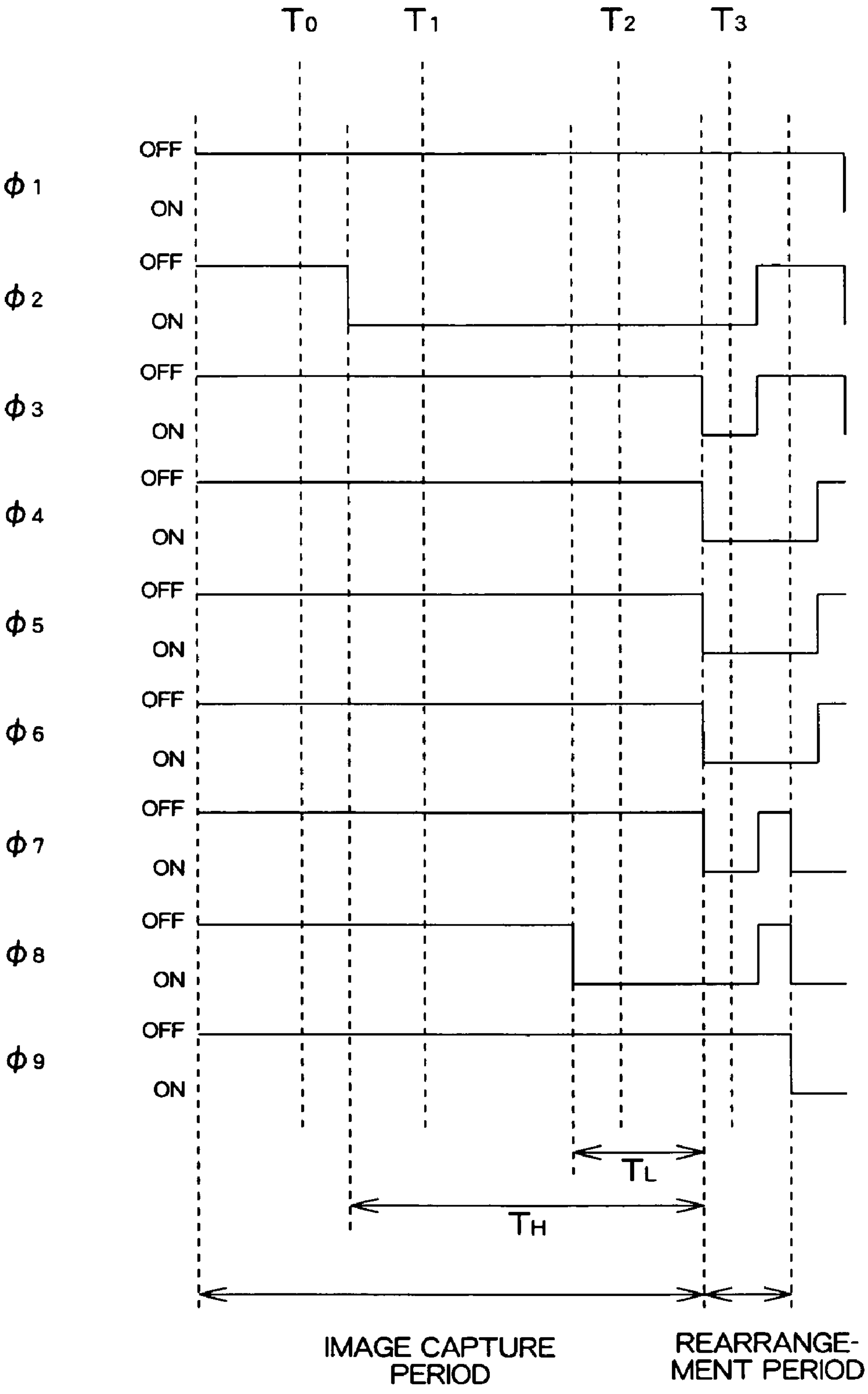
FIG. 13 is a timing chart showing clock pulses supplied to a CCD solid state image capture element according to a second modification example.
Figure 14:
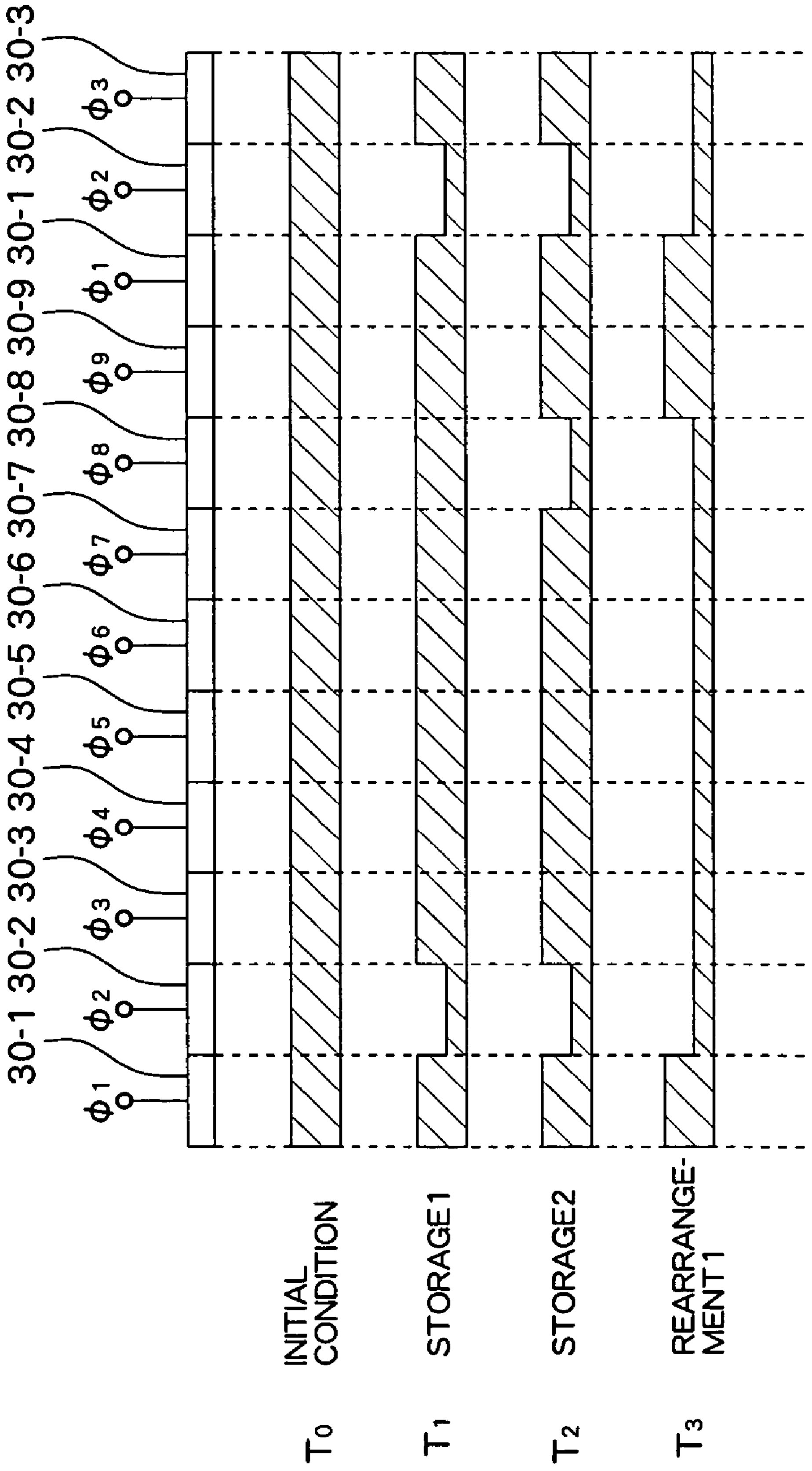
FIG. 14 shows changes in state of potential occurring below transfer electrodes according to the second modification example.

Referring now to FIG. 13, that is, a timing chart showing clock pulses for periods of image capture and rearrangement, control of the transfer electrodes will be described below. Further, FIG. 14 shows a state of changes in potential occurring below the transfer electrodes 30-1 to 30-9 at times $T_1$ to $T_3$. In this chart, the horizontal axis indicates positions along the transfer direction in the image capture section **2*i***, and the vertical axis indicates potentials at the respective positions. The lower side in this chart represents a positive potential, and the upper side represents a negative potential.

The driver circuit 206 receives a control signal from the timing control circuit 204, and applies clock pulses $\phi_1$ to $\phi_9$ to the transfer electrodes 30-1 to 30-9, respectively. An n-type semiconductor substrate (N-SUB) 10 of the CCD solid state image capture element 202 is fixed to a substrate potential $V_{sub}$.

In the present modification example, a plurality of pixels successively arranged along the same transfer channel are used as a unit, and the transfer electrodes provided for pixels in each unit are turned on for respective different on-gate periods. At time $T_0$, all clock pulses $\phi_1$ to $\phi_9$ are turned off so that, as shown in FIG. 14, no potential well is formed below the transfer electrodes 30-1 to 30-9, and electric charges are discharged to the substrate 10. At time $T_1$, the clock pulses are controlled so that a potential well is formed in a pixel positioned at one end of a group of pixels used as a unit. At this time, only the clock pulse $\phi_2$ is turned on so that a potential well is formed below the transfer electrode 30-2. Information charges generated in response to incident light around the turned-on transfer electrode 30-2 are stored in this potential well. Then, at time $T_2$, the clock pulses are controlled so that a potential well is formed in a pixel positioned at each end of a group of pixels used as a unit. At this time, in addition to the clock pulse $\phi_2$, the clock pulse $\phi_8$ is turned on so that potential wells are formed below the transfer electrodes 30-2 and 30-8. Information charges generated in response to incident light around the turned-on transfer electrodes 30-2 and 30-8 are stored in these potential wells. At time $T_3$, the information charges are rearranged. From then on, the information charges can be transferred in a similar manner to that during the period from time $T_4$ in the above-described embodiment.

In other words, during image capture, a potential well is formed below the transfer electrode 30-2 for an on-gate period $T_H$ equal to an image capture period T, and a potential well is formed below the transfer electrode 30-8 for an on-gate period $T_L$ shorter than the on-gate period $T_H$.

In this process, it is preferable that the timing control circuit 204 controls the on-gate periods $T_H$ and $T_L$ in accordance with the maximum signal strength for the previous frame. The control is performed such that the smaller the maximum signal strength, the longer the off-gate period, and such that the greater the maximum signal strength, the longer the on-gate period. This is intended to control the image capture period using the tendency that the maximum signal strength does not change drastically between successive captured images. Further, after the passing of a long period of time from the previous image capture, or in cases where a reliably adequate dynamic range should be ensured, it is preferable that an image for one frame is temporarily and preliminarily captured and output in order to detect the maximum signal strength so that the image capture period can be adjusted based on the detected maximum signal strength before actual image capture.

Figure 15:
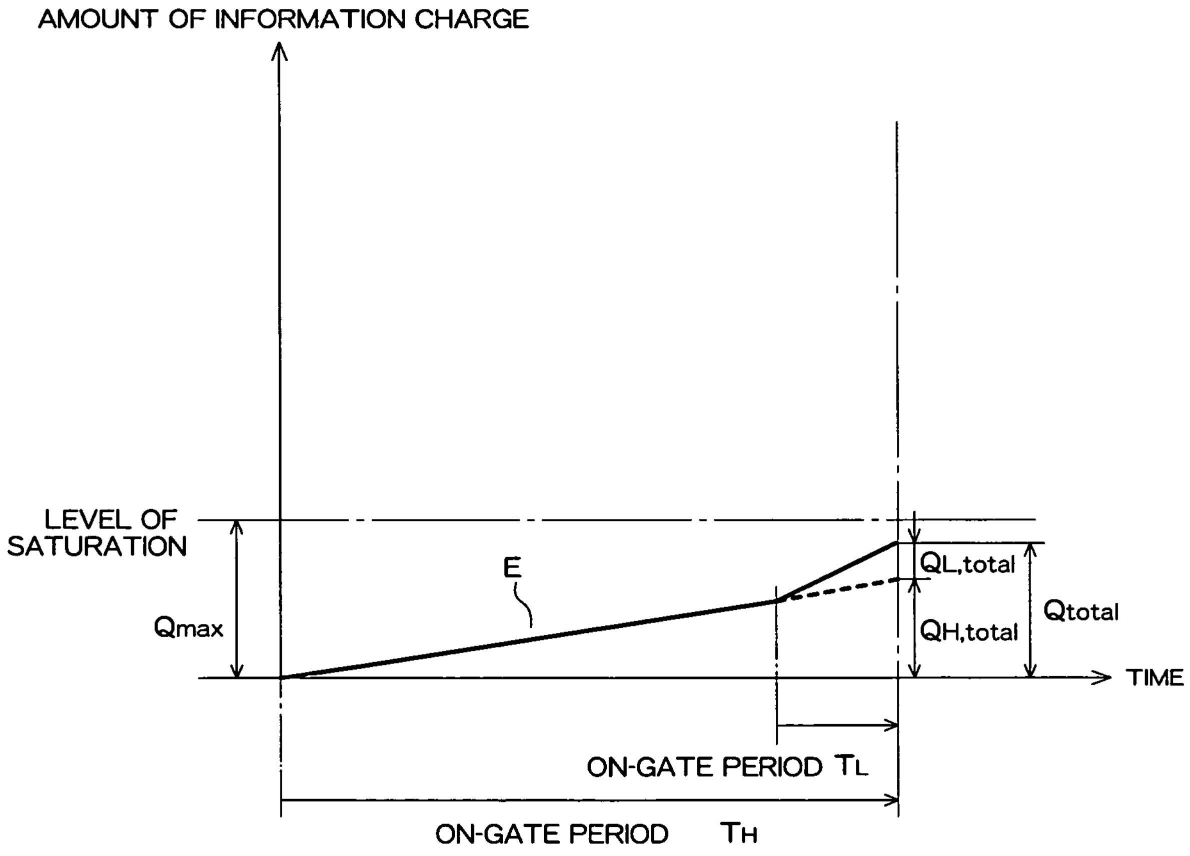
FIG. 15 illustrates a state of storage of information charges during a period of image capture according to the second modification example.

When weak light is incident on pixels of the image capture section 2*i*, as shown in FIG. 15, the amount of information charge stored in a potential well for each pixel per unit time (i.e., the gradient of line E shown in FIG. 15) is small. In such cases, because amounts of information charge $Q_{H,\ total}$ and $Q_{L,\ total}$ to be stored in the on-gate periods $T_H$ and $T_L$, respectively, are smaller than the level of saturation $Q_{max}$ of each potential well, an adequate dynamic range can be ensured.

Figure 16:
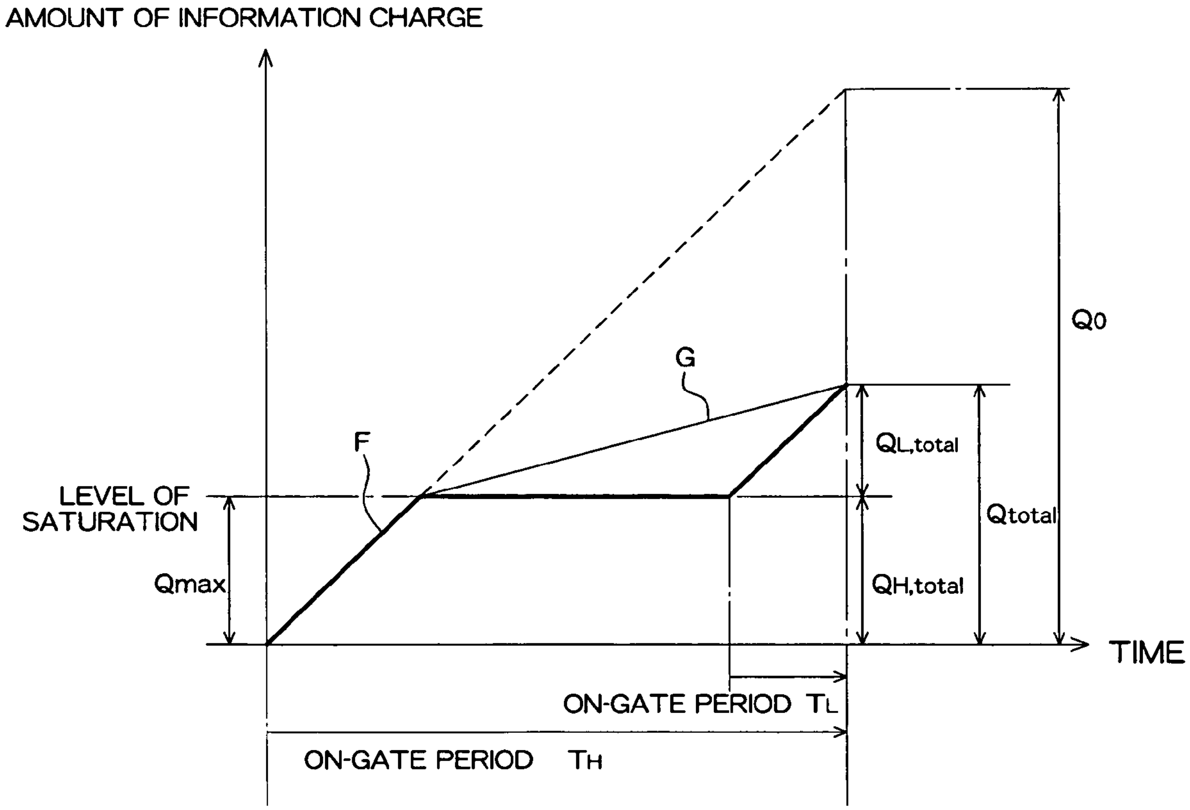
FIG. 16 illustrates a state of storage of information charges during a period of image capture according to the second modification example.
Figure 17:
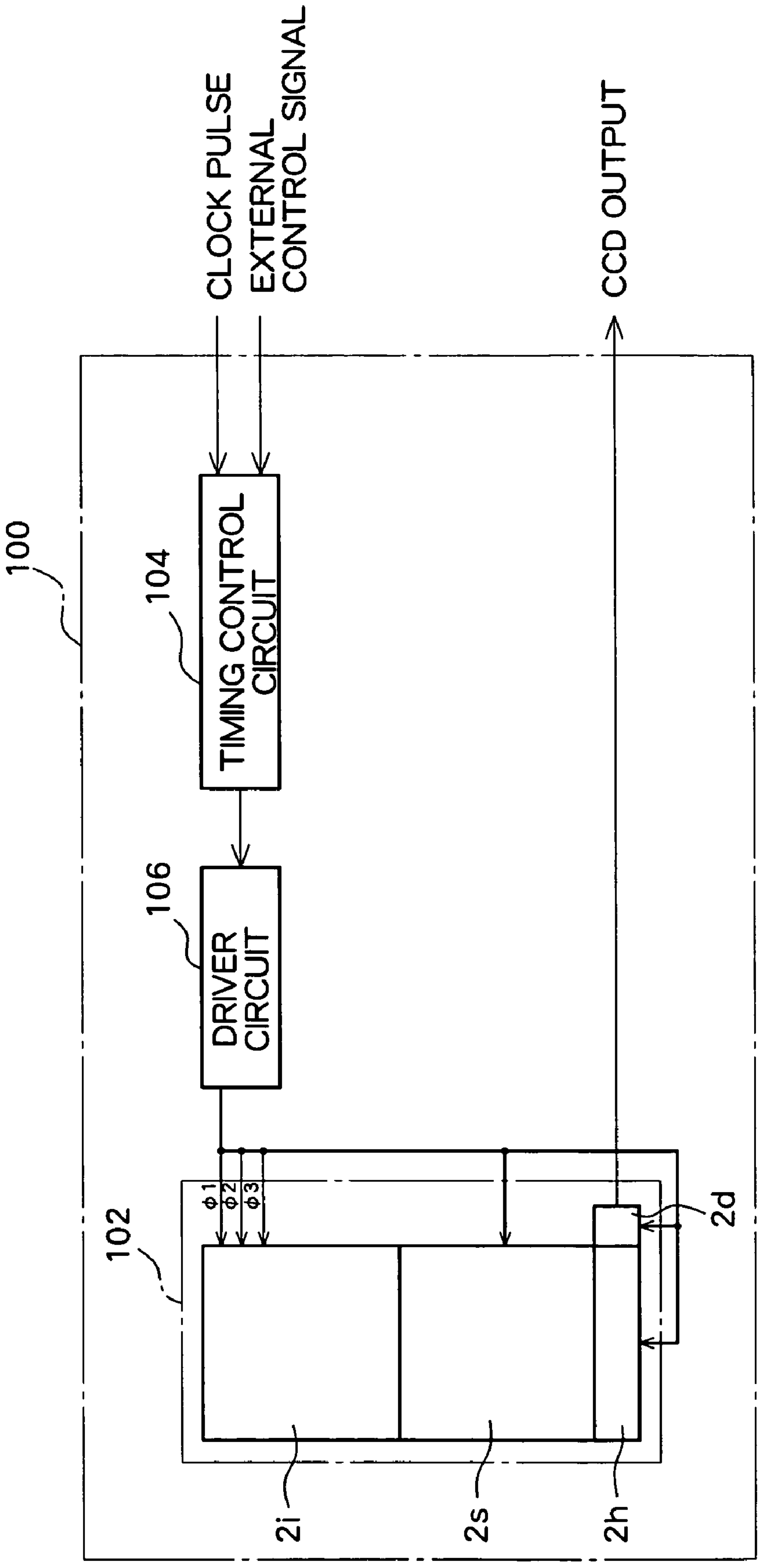
FIG. 17 is a block diagram showing a structure of an image capture device according to a related art.
Figure 18A:
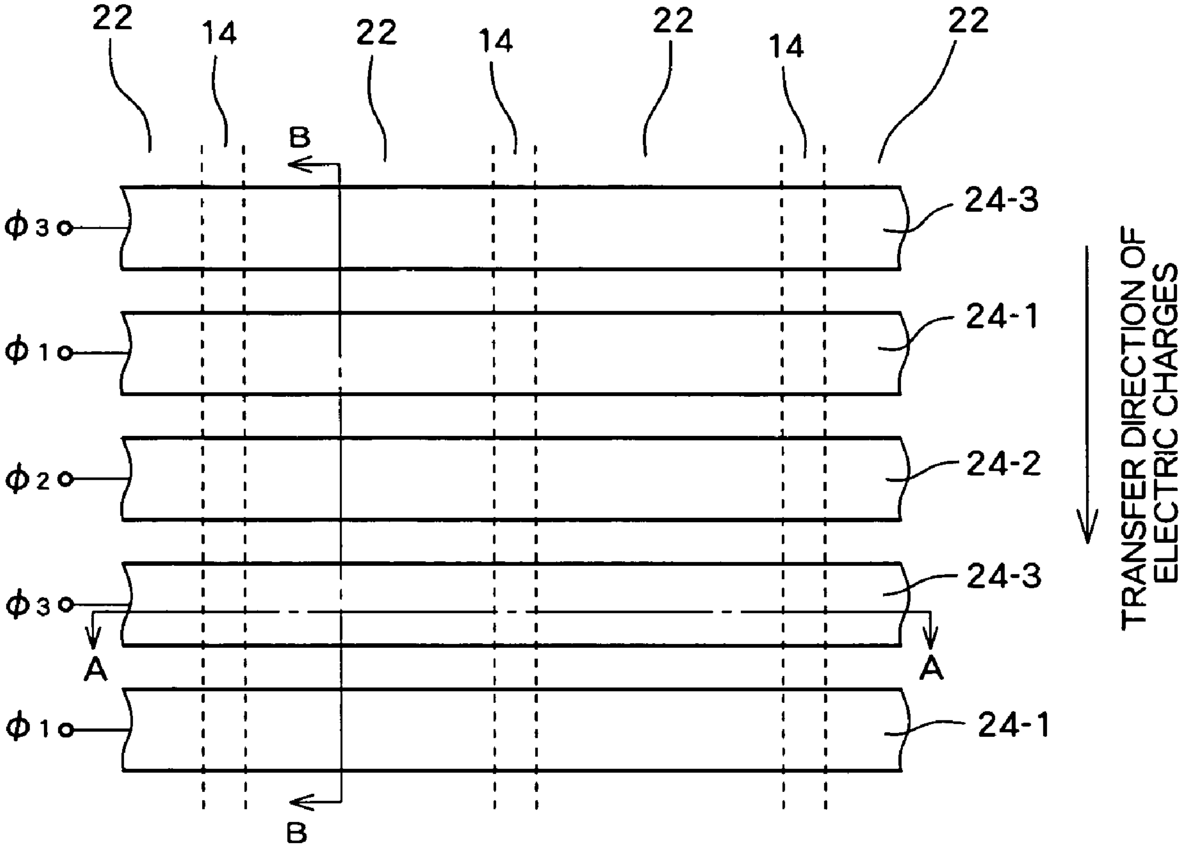
FIG. 18A is a plan view showing an internal structure of an image capture section in a CCD solid state image capture element according to the related art.
Figure 18B:
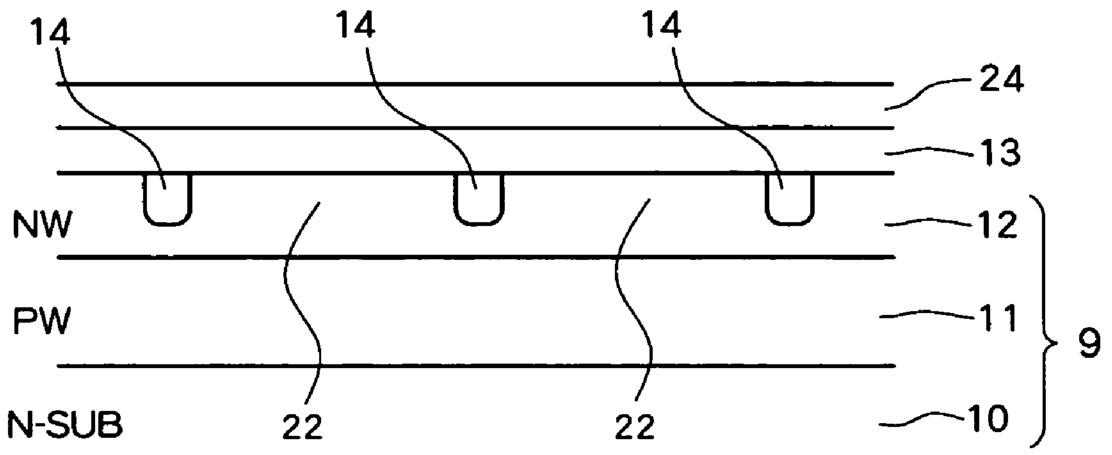
FIGS. 18B and 18C are cross-sectional views showing the internal structure of the image capture section in the CCD solid state image capture element according to the related art.
Figure 18C:
Figure 19:
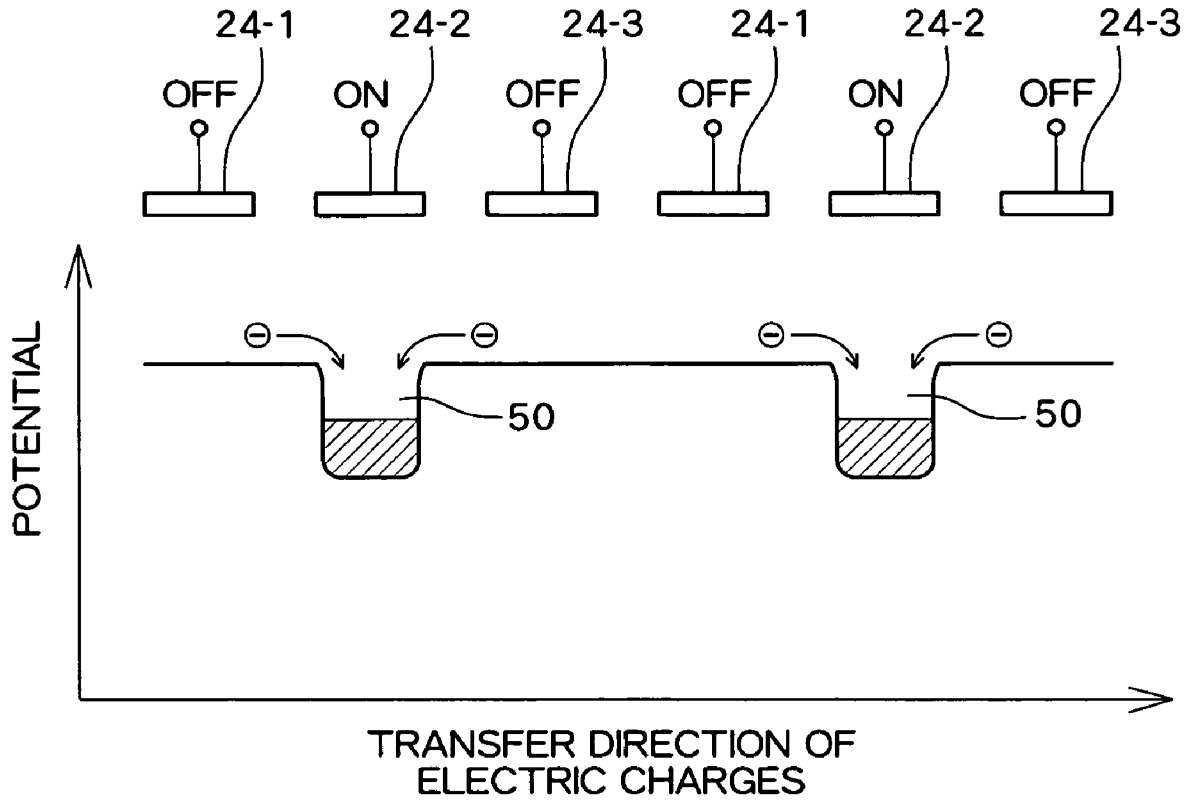
FIG. 19 illustrates storage of information charges during image capture according to the related art.
Figure 20:
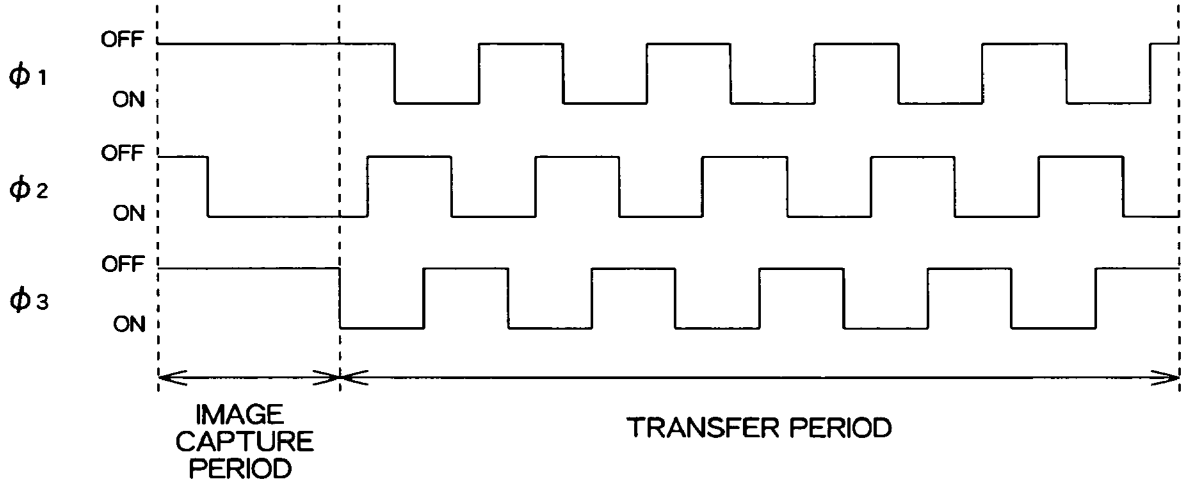
FIG. 20 is a timing chart showing clock pulses supplied to transfer electrodes during image capture and transfer in the CCD solid state image capture element according to the related art.

When strong light is incident on pixels of the image capture section 2*i*, as shown in FIG. 16, the amount of information charge stored in each pixel per unit time (i.e., the gradient of line F shown in FIG. 16) is large. In such cases, an amount of information charge $Q_{H,total}$ to be stored in a potential well formed below the transfer electrode 30-2 that is turned on for the long on-gate period $T_H$ exceeds the level of saturation of the potential well. On the other hand, an amount of information charge $Q_{L,\ total}$ to be stored in a potential well formed below the transfer electrode 30-8 that is turned on for the short on-gate period $T_L$ does not exceed the level of saturation of the potential well. Therefore, an amount of output information charge $Q_{total}$, which is the sum of the amounts of information charge $Q_{H,\ total}$ and $Q_{L,\ total}$, has a Knee characteristic as shown by line G in FIG. 16.

When weak light is incident on pixels of the image capture section 2*i*, the amount of information charge $Q_{H,\ total}$ stored in the long on-gate period $T_H$ can be calculated from the amount of output information charge $Q_{total}$ using the equation (9). Similarly, the amount of information charge $Q_{L,\ total}$ stored in the short on-gate period $T_L$ can be calculated from the amount of output information charge $Q_{total}$ using the equation (10). However, if the calculated amount of information charge $Q_{H,\ total}$ exceeds the level of saturation $Q_{max}$, it is necessary to recalculate the amount of information charge $Q_{H,\ total}$ and the amount of information charge $Q_{L,\ total}$ using the equations (11) and (12), respectively. The level of saturation $Q_{max}$ for the image capture section 2*i* of the CCD solid state image capture element 202 can be obtained beforehand.

$$Q_{H,total}=Q_{total}*(T_H/T_H+T_L) \tag{9}$$

$$Q_{L,total}=Q_{total}*(T_L/T_H+T_L) \tag{10}$$

$$Q_{H,total}=Q_{max} \tag{11}$$

$$Q_{L,total}=Q_{total}-Q_{max} \tag{12}$$

In this example, the ideal amount of information charge that should be stored in a potential well for each pixel in the long on-gate period $T_H$ when the capacity of a potential well is sufficiently adequate to not saturate the potential well is defined as $Q_{ideal}$. If it is assumed that there is no occurrence of smear charge affecting the image capture section 2*i* during transfer, the ratio of the amount of information charge $Q_{L,\ total}$ stored in the short on-gate period $T_L$ to the ideal amount of information charge $Q_{ideal}$, i.e., $Q_{L,\ total}/Q_{ideal}$, is equal to the ratio of the on-gate periods $T_L/T_H$. Therefore, the ideal amount of information charge $Q_{ideal}$ can be calculated based on the equations (13) and (14).

$$Q_{ideal}=Q_{L,total}*(T_H/T_L)=Q_{H,total};\ (Q_{H,total}\leqq Q_{max}) \tag{13}$$

$$Q_{ideal}=Q_{L,total}*(T_H/T_L)=(Q_{total}-Q_{max})*(T_H/T_L);\ (Q_{H,total}>Q_{max}) \tag{14}$$

Because the level of saturation $Q_{max}$ (or, an output signal value corresponding to the level of saturation $Q_{max}$) of a potential well for each pixel can be checked in advance, the ideal amount of output information charge $Q_{itotal}$ that should be stored during a period of image capture can also be calculated.

The output signal processor 208 can obtain an ideal output signal $S_{ideal}$ by performing processing on an output signal received from the CCD solid state image capture element 202, as described below. The ideal output signal $S_{ideal}$ is a signal proportional to the amount of information charge $Q_{itotal}$. Therefore, the output signal $S_{ideal}$ can be calculated by multiplying the amount of information charge $Q_{itotal}$ by a predetermined factor.

As described above, according to the second modification example, a group of pixels store information charges for the different on-gate periods $T_H$ and $T_L$ so that, even when strong light is incident on pixels of the image capture section 2*i*, the correct amount of information charge and output signal can be obtained in accordance with the intensity of light. As a result, an image signal thus obtained can have an adequate dynamic range.

Further, the present invention can also be preferably implemented by combining the technical ideas of the above-described embodiment and modification examples. Still further, the specific structures used in the above-described embodiment and modification examples can also be changed as desired as long as the technical idea of the present invention can be achieved.

What is claimed is:

1. An image capture device, comprising a shift register including a plurality of pixels to generate information charges in response to light coming from outside and to store information charges generated in response to light of one of two or more different wavelength ranges, each pixel having a plurality of transfer electrodes extending in a direction crossing a transfer direction of information charges, such that a potential well formed by function of the transfer electrodes is used to store and transfer information charges generated in response to light incident on a pixel, wherein during image capture, information charges are stored in a plurality of potential wells substantially separated from each other, during transfer, information charges stored in at least two of the plurality of potential wells in response to light of a same wavelength range are combined by addition in one potential well along the transfer direction to be transferred, the information charges combined by addition are converted into a voltage value and then output, and a group of at least two adjacent transfer electrodes successively arranged along the transfer direction are used as a unit, and a control circuit is provided to supply, during transfer, clock pulses having substantially the same phase to each group of transfer electrodes used as a unit.

2. An image capture device according to claim 1, wherein a group of at least two pixels successively arranged along the transfer direction are used as a unit, and the control circuit independently controls the transfer electrodes included in each group of pixels used as a unit.

3. An image capture device according to claim 1, wherein each pixel stores information charges generated in response to light of one of two or more different wavelength ranges, during transfer, information charges stored in at least two pixels that generate information charges in response to light of different wavelength ranges are combined by addition to be transferred, and an output signal processor is provided to obtain, after transfer, a signal corresponding to information charges for each wavelength component based on the information charges combined by addition.

4. A controller of an image capture device, the image capture device comprising a shift register including a plurality of pixels to generate information charges in response to light coming from outside and to store information charges generated in response to light of one of two or more different wavelength ranges, such that a potential well is used to store and transfer information charges generated in response to light incident on a pixel, wherein during image capture, information charges are stored in a plurality of potential wells substantially separated from each other, during transfer, information charges stored in at least two of the plurality of potential wells in response to light of a same wavelength range are combined by addition in one potential well along the transfer direction to be transferred, the information charges combined by addition are converted into a voltage value and then output, and a group of at least two adjacent transfer electrodes successively arranged along the transfer direction are used as a unit, and, during transfer, clock pulses having substantially the same phase are supplied to each group of transfer electrodes used as a unit.

5. A controller of an image captured device according to claim 4, wherein when each pixel of the shift register has a plurality of transfer electrodes extending in a direction crossing the transfer direction of information charges, a group of at least two pixels successively arranged along the transfer direction are used as a unit, and the transfer electrodes included in each group of pixels used as a unit are controlled independently.

6. An image capture device, comprising a shift register including a plurality of pixels that have transfer electrodes and generate information charges in response to light coming from outside, and stores information charges generated in response to light of one of two or more different wavelength ranges, such that information charges generated in response to light incident on a pixel are stored and transferred by function of the transfer electrodes, wherein during image capture, information charges generated in a first on-gate period are stored in a first pixel, and information charges generated in a second on-gate period shorter than the first on-gate period are stored in a second pixel substantially separated from the first pixel and generated in response to light of a wavelength range identical to that of the first pixel, during transfer, information charges stored in the first pixel and the second pixel are combined along the transfer direction by addition in one potential well to be transferred, the information charges combined by addition are converted into a voltage value and then output, the first pixel and the second pixel are arranged along the same shift register, and a group of at least two adjacent transfer electrodes successively arranged along a transfer direction of information charges are used as a unit, and a control circuit is provided to supply, during transfer, clock pulses having substantially the same phase to each group of transfer electrodes used as a unit.

7. An image capture device according to claim 6, wherein a group of at least two pixels successively arranged along a transfer direction of information charges are used as a unit, and the control circuit independently controls the transfer electrodes included in each group of pixels used as a unit.

8. An image capture device according to claim 6, further comprising an output signal processor that calculates, based on the information charges combined by addition, the first on-gate period, and the second on-gate period, a signal corresponding to an ideal amount of information charge expected to be stored during image capture.

9. A controller of an image capture device, the image capture device comprising a shift register including a plurality of pixels that have transfer electrodes, and generate information charges in response to light coming from outside, and stores information charges generated in response to light of one of two or more different wavelength ranges, such that information charges generated in response to light incident on a pixel are stored and transferred by function of the transfer electrodes, wherein during image capture, information charges generated in a first on-gate period are stored in a first pixel, and information charges generated in a second on-gate period shorter than the first on-gate period are stored in a second pixel substantially separated from the first pixel and generated in response to light of a wavelength range identical to that of the first pixel, during transfer, information charges stored in the first pixel and the second pixel are combined by addition in one potential well along the transfer direction to be transferred, the information charges combined by addition are converted into a voltage value and then output, the controller controls the image capture device having the first pixel and the second pixel arranged along the same shift register, and a group of at least two adjacent transfer electrodes successively arranged along a transfer direction of information charges are used as a unit, and, during transfer, clock pulses having substantially the same phase are supplied to each group of transfer electrodes used as a unit.

10. A controller of an image capture device according to claim 9, wherein a group of at least two pixels successively arranged along a transfer direction of information charges are used as a unit, and the transfer electrodes included in each group of pixels used as a unit are controlled independently.

* * * * *